(12) United States Patent
Mochizuki et al.

(10) Patent No.: US 9,226,221 B2
(45) Date of Patent: Dec. 29, 2015

(54) MOBILE COMMUNICATION SYSTEM

(75) Inventors: Mitsuru Mochizuki, Tokyo (JP); Miho Maeda, Tokyo (JP); Yasushi Iwane, Tokyo (JP); Yuji Kakehi, Tokyo (JP); Masayuki Nakazawa, Tokyo (JP); Taisei Suemitsu, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 0 days.

(21) Appl. No.: 13/499,737

(22) PCT Filed: Sep. 15, 2010

(86) PCT No.: PCT/JP2010/005625
§ 371 (c)(1),
(2), (4) Date: Apr. 2, 2012

(87) PCT Pub. No.: WO2011/039960
PCT Pub. Date: Apr. 7, 2011

(65) Prior Publication Data
US 2012/0196603 A1    Aug. 2, 2012

(30) Foreign Application Priority Data
Oct. 2, 2009    (JP) .................. 2009-230548

(51) Int. Cl.
*H04W 36/00* (2009.01)
*H04W 4/00* (2009.01)
(Continued)

(52) U.S. Cl.
CPC .............. *H04W 48/02* (2013.01); *H04J 11/00* (2013.01); *H04W 28/048* (2013.01); *H04W 60/00* (2013.01); *H04W 74/02* (2013.01); *H04W 88/085* (2013.01); *H04W 88/10* (2013.01)

(58) Field of Classification Search
USPC ................... 455/436, 422.1, 434, 435.1, 444
See application file for complete search history.

(56) References Cited

U.S. PATENT DOCUMENTS

| 8,149,749 B2 | 4/2012 | Maeda et al. |
| 2009/0042595 A1 | 2/2009 | Yavuz et al. |

(Continued)

FOREIGN PATENT DOCUMENTS

| CN | 1945995 A | 4/2007 |
| JP | 5-55994 | 3/1993 |

(Continued)

OTHER PUBLICATIONS

3GPP TS 36.000 V9.1.0 (Sep. 2009).*

(Continued)

*Primary Examiner* — William Nealon
(74) *Attorney, Agent, or Firm* — Oblon, McClelland, Maier & Neustadt, L.L.P.

(57) ABSTRACT

A mobile communication system hybridly allows, in a case where an access group consisting of one or more user equipments and one or more base stations is registered, the base station included in the access group to have access in a closed mode from the user equipment included in the same access group and access in an open mode from a user equipment that is not included in the same access group, wherein a communication area of the base station in the open mode is identical to a communication area of the base station in the closed mode. This eliminates a communication area in which the base station serving as an access destination differs between the user equipment in the closed mode and the user equipment in the open mode.

17 Claims, 22 Drawing Sheets

(51) Int. Cl.

| | | |
|---|---|---|
| *H04W 48/02* | (2009.01) | |
| *H04J 11/00* | (2006.01) | |
| *H04W 28/04* | (2009.01) | |
| *H04W 60/00* | (2009.01) | |
| *H04W 74/02* | (2009.01) | |
| *H04W 88/10* | (2009.01) | |
| *H04W 88/08* | (2009.01) | |

(56) References Cited

U.S. PATENT DOCUMENTS

| | | | |
|---|---|---|---|
| 2009/0047960 A1* | 2/2009 | Gunnarsson et al. | 455/436 |
| 2009/0156208 A1* | 6/2009 | Vesterinen et al. | 455/435.1 |
| 2009/0305699 A1* | 12/2009 | Deshpande et al. | 455/434 |
| 2010/0029283 A1* | 2/2010 | Iwamura | 455/437 |
| 2010/0061285 A1 | 3/2010 | Maeda et al. | |
| 2010/0178895 A1 | 7/2010 | Maeda et al. | |
| 2011/0216732 A1 | 9/2011 | Maeda et al. | |
| 2011/0261777 A1 | 10/2011 | Maeda et al. | |
| 2011/0280223 A1 | 11/2011 | Maeda et al. | |
| 2012/0044870 A1 | 2/2012 | Mochizuki et al. | |
| 2012/0044910 A1 | 2/2012 | Maeda et al. | |
| 2012/0087314 A1 | 4/2012 | Maeda et al. | |

FOREIGN PATENT DOCUMENTS

| | | |
|---|---|---|
| JP | 2002-165247 | 6/2002 |
| JP | 2004-172882 | 6/2004 |
| WO | WO 2008/081816 A1 | 7/2008 |
| WO | WO 2009/023587 A2 | 2/2009 |
| WO | WO 2009/023604 A2 | 2/2009 |

OTHER PUBLICATIONS

International Preliminary Report on Patentability issued Apr. 3, 2012 in PCT/JP2010/005625 filed Sep. 15, 2010 (with English translation).
International Preliminary Report on Patentability and Written Opinion issued May 8, 2012 in PCT/JP2010/005625 filed Sep. 15, 2010.
International Search Report issued Dec. 7, 2010 in PCT/JP2010/005625.
3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 2009, pp. 1-157.
3GPP R1-072963, "Signaling of MBSFN subframe allocation in D-BCH", Nokia Siemens Networks, Nokia, Huawei, 3GPP TSG-RAN WG1, Agenda item: 5.3, Meeting #49bis, R1-072963, Jun. 25-29, 2007, 5 pages.
3GPP T536.304 V8.6.0, (Jun. 2009), 3rd Generation Partnership Project; Technical Specification Group Radio Access Network; Evolved Universal Terrestrial Radio Access (E-UTRA); User Equipment (UE) procedures in idle mode, (Jun. 2009), (Release 8), pp. 1-30.
3GPP S1-083461, "LS on HNB/HeNB Open Access Mode", 3GPP SA WG1, 3GPP TSG-SA1 #42, S1-083461, Oct. 13-17, 2008, Release: Rel-9, pp. 2.
3GPP R2-082899, "LS on CSG cell identification", RAN2, 3GPP TSG-RAN WG 2 meeting #62, R2-082899, May 5-9, 2008, 2 pages.
3GPP TS 22.220 V9.1.1 (Jun. 2009), 3rd Generation Partnership Project; Technical Specification Group Services and System Aspects; Service requirements for Home NodeBs and Home eNodeBs, 2009, (Release 9), pp. 1-22.
3GPP R2-093950, "Open issues for Hybrid/Open cells", Qualcomm Europe, 3GPP TSG-RAN WG2 Meeting #66bis, R2-093950, Jun. 29-Jul. 3, 2009, 2 pages.
3GPP R3-091053, "Congested H(e)NB Hybrid Access Mode cell", Alcatel-Lucent, Vodafone, 3GPP TSG-RAN WG3 Meeting #64 R3-091053, May 4-8, 2009, 4 pages.
3GPP TS 36.331 V8.6.0 (Jun. 2009), 3rd Generation Partnership Project; Technical Specification Group Radio Access Network; Evolved Universal Terrestrial Radio Access (E-UTRA), Radio Resource Control (RRC); Protocol specification, 2009, (Release 8), pp. 1-207.
3GPP TS36.101 V8.6.0, 3GPP TS 36.101 V8.6.0 (Jun. 2009), 3rd Generation Partnership Project; Technical Specification Group Radio Access Network; Evolved Universal Terrestrial Radio Access (E-UTRA); User Equipment (UE) radio transmission and reception, 2009, (Release 8), pp. 1-143.
Chinese Office Action dated Apr. 9, 2014, in Chinese Application No. 201080043994.5 (with a partial English translation).
3GPP TSG-RAN WG3 Meeting #65 R3-091800, ETRI, 3GPP, Aug. 28, 2009, 2 pages.
3GPP TS 36.300 V9.1.0, 3GPP, 3GPP, Sep. 30, 2009, 6 pages (cover and pp. 155-159).
3GPP TSG RAN WG3 #63 bis R3-090869, Vodafone, 3GPP, Mar. 27, 2009, 2 pages.
3GPP TSG RAN WG4 #51 bis R4-092504, Vodafone, Qualcomm Europe, 3GPP, Jul. 2, 2009, 5 pages.
U.S. Appl. No. 14/298,168, filed Jun. 6, 2014, Mochizuki, et al.
U.S. Appl. No. 13/420,306, filed Mar. 14, 2012, Maeda, et al.
U.S. Appl. No. 13/499,026, filed Mar. 29, 2013, Maeda, et al.
U.S. Appl. No. 13/504,672, filed Apr. 27, 2012, Maeda, et al.
U.S. Appl. No. 14/531,516, filed Nov. 3, 2014, Maeda, et al.
U.S. Appl. No. 14/534,958, filed Nov. 6, 2014, Mochizuki, et al.
Combined Chinese Office Action and Search Report issued Feb. 28, 2015 in Patent Application No. 201080043994.5 (with partial English language translation).
U.S. Appl. No. 13/499,737, filed Apr. 2, 2012, Mochizuki, et al.
U.S. Appl. No. 14/707,505, filed May 8, 2015, Maeda, et al.
Office Action issued Sep. 15, 2015 in Japanese Patent Application No. 2014-143950 (with Partial English-language Translation).

* cited by examiner

F I G . 1
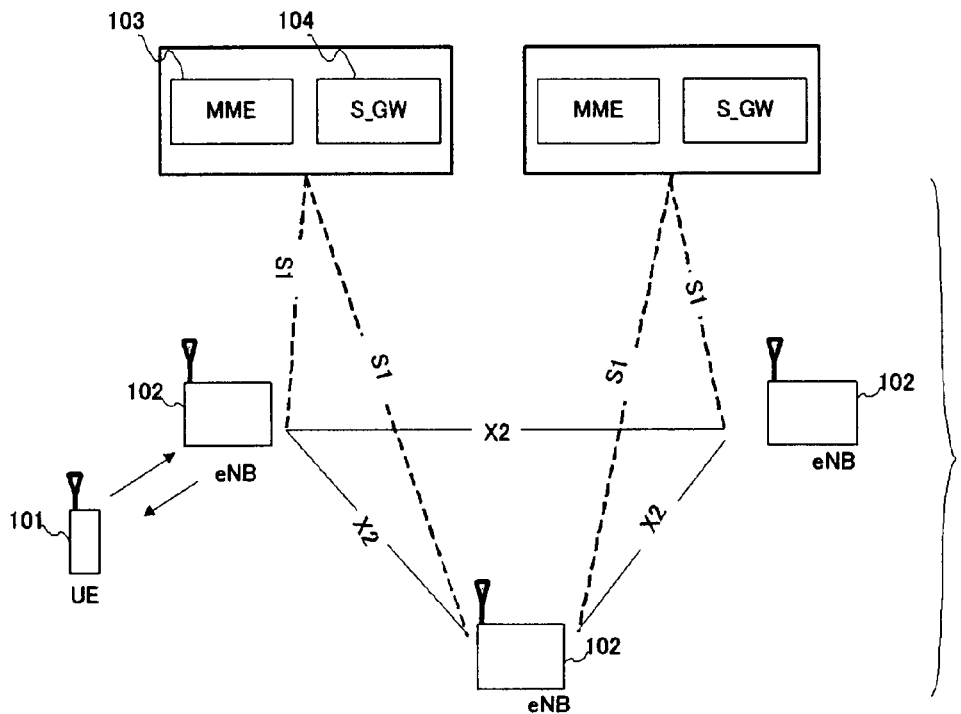
F I G . 2
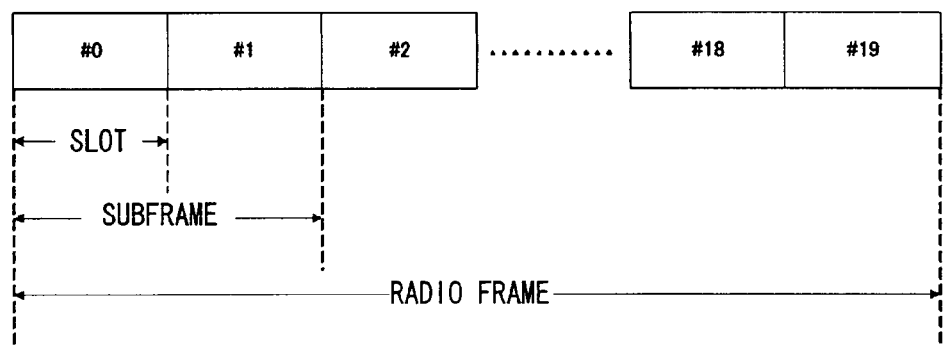

FIG. 5
[A]
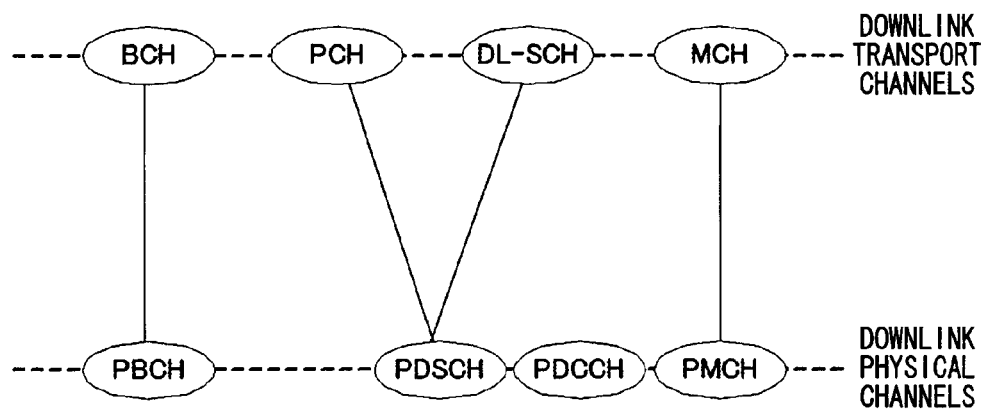
[B]
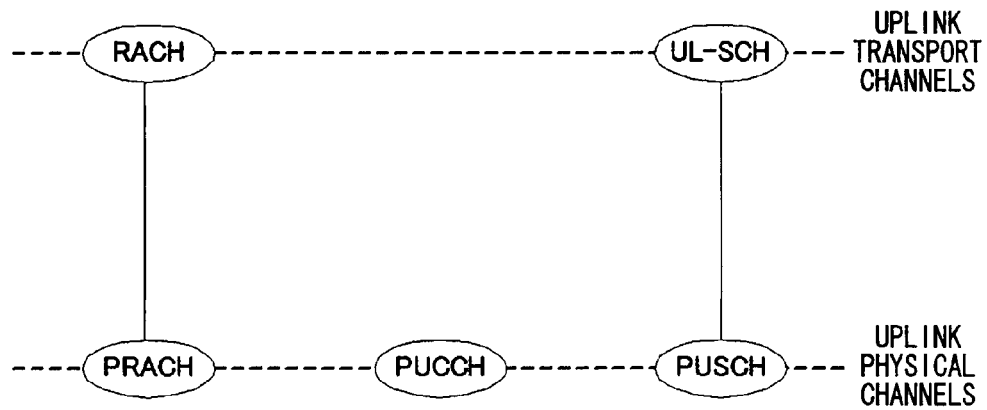

F I G . 6
[A]
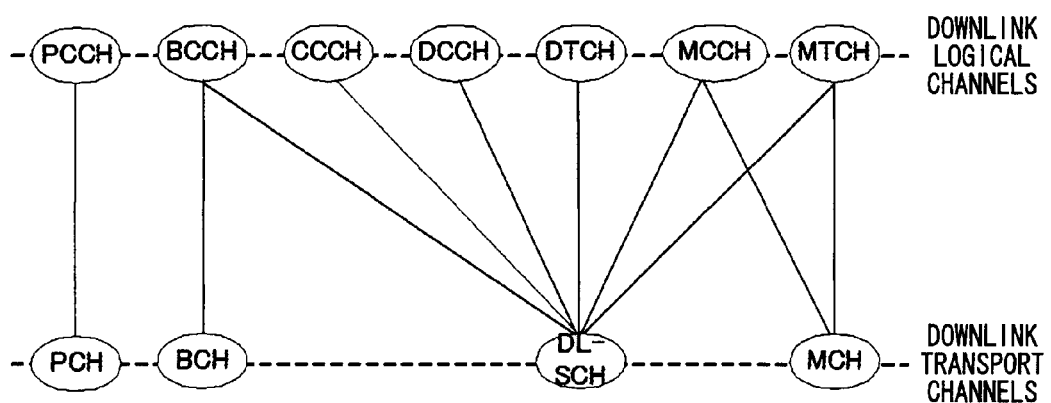
[B]
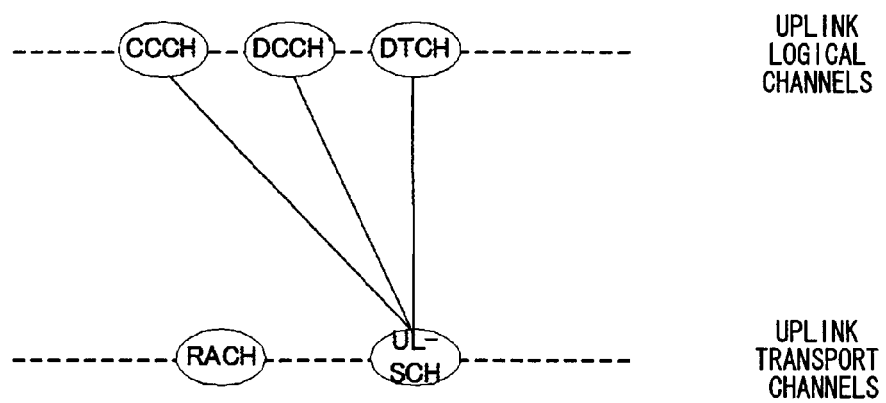

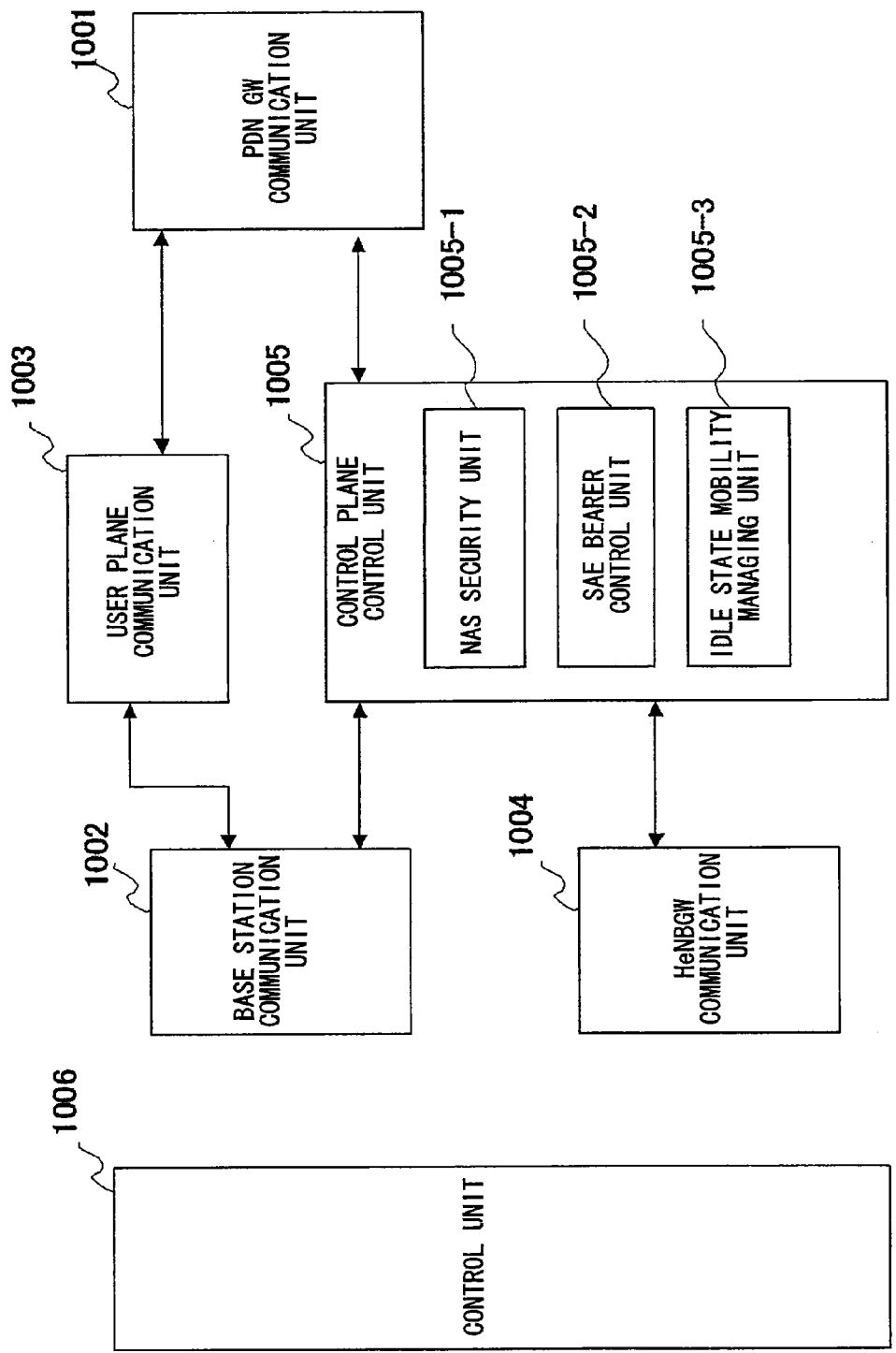

F I G . 1 1
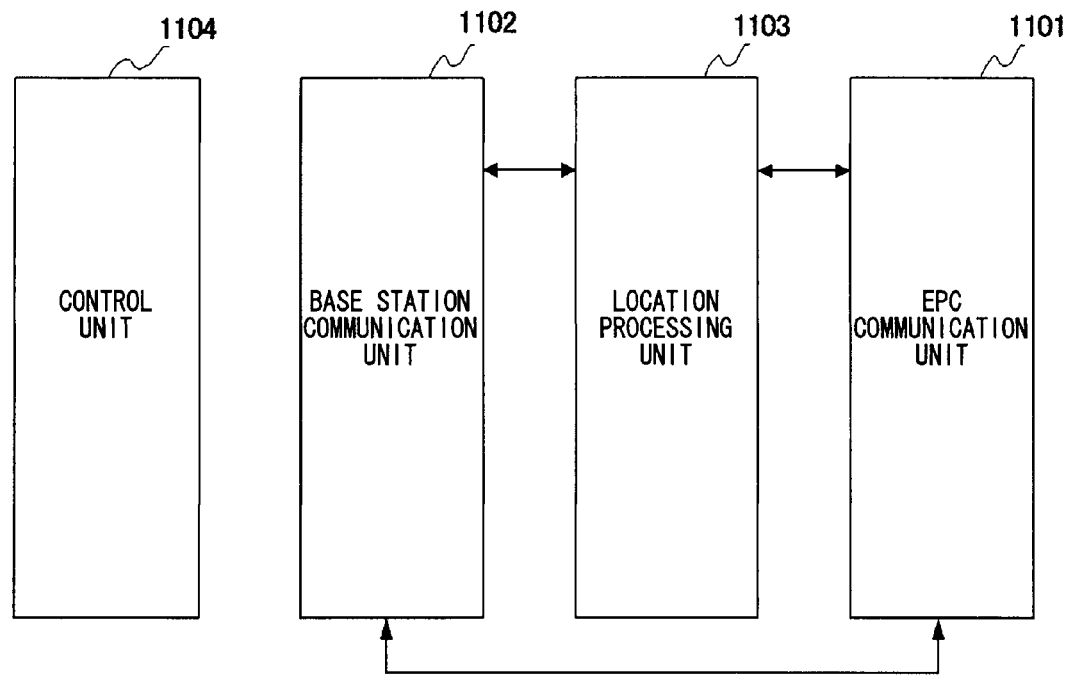

F I G. 1 3
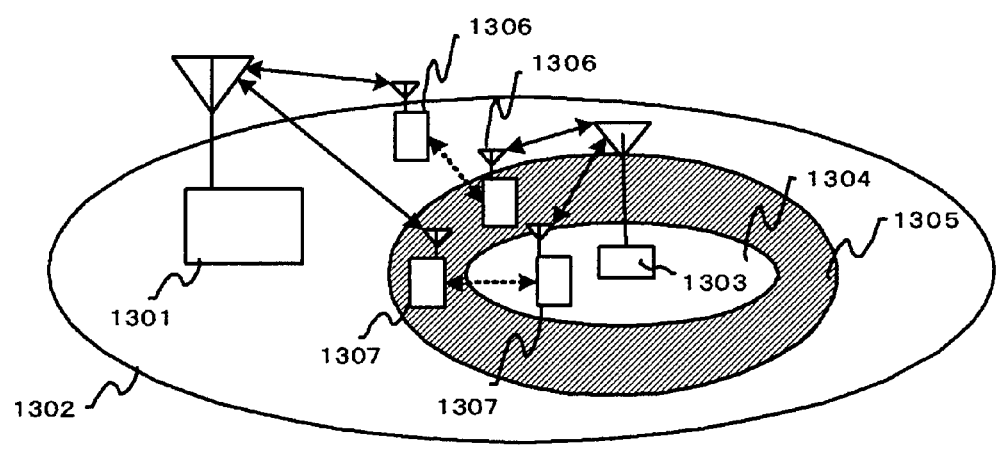

MOBILE COMMUNICATION SYSTEM

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed down link packet access (HSDPA) service for achieving higher-speed data transmission using a down link has been offered by adding a channel for packet transmission high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4.6.1 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

The control protocol RRC between the UE 101 and the base station 102 performs broadcast, paging, RRC connection management and the like. The states of the base station and the UE in RRC are classified into RRC_Idle and RRC_CONNECTED. In RRC_IDLE, public land mobile network (PLMN) selection, system information (SI) broadcast, paging, cell reselection, mobility and the like are performed. In RRC_CONNECTED, the UE has RRC connection, is capable of transmitting/receiving data to/from a network, and performs, for example, handover (HO) and measurement of a neighbor cell.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN cub frame subframe. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a closed subscriber group (CSG) cell as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the UE 101. A BCH transport block is mapped to four subframes within a 40 ms interval. There is no explicit signaling indicating 40 ms timing. A physical control format indicator channel (PCFICH) 402 is transmitted from the base station 102 to the UE 101. The PCFICH notifies the number of OFDM symbols used for PDCCHs from the base station 102 to the UE 101. The PCFICH is transmitted in each subframe. A physical downlink control channel (PDCCH) 403 is a downlink channel transmitted from the base station 102 to the UE 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is referred to as an L1/L2 control signal as well. A physical downlink shared channel (PDSCH) 404 is a downlink channel transmitted from the base station 102 to the UE 101. A DL-SCH (downlink shared channel) that is a transport channel and a PCH that is a transport channel are mapped to the PDSCH. A physical multicast channel (PMCH) 405 is a downlink channel transmitted from the base station 102 to the UE 101. A multicast channel (MCH) that is a transport channel is mapped to the PMCH.

A physical uplink control channel (PUCCH) 406 is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the UE 101 to the base station 102. A UL-SCH (uplink shared channel that is one of the transport channels shown in FIG. 5) is mapped to the PUSCH. A physical hybrid ARQ indicator channel (PHICH) 408 is a downlink channel transmitted from the base station 102 to the UE 101. The PHICH carries ACK/Nack that is a response to uplink transmission. A physical random access channel (PRACH) 409 is an uplink channel transmitted from the UE 101 to the base station 102. The PRACH carries a random access preamble.

A downlink reference signal which is a known symbol in a mobile communication system is inserted in the first, third and last OFDM symbols of each slot. The physical layer measurement objects of a UE include, for example, reference symbol received power (RSRP).

The transport channel (Chapter 5 of Non-Patent Document 1) is described with reference to FIG. 5. FIG. 5 is a diagram illustrating transport channels used in the LTE communication system. Part [A] of FIG. 5 shows mapping between a downlink transport channel and a downlink physical channel. Part [B] of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH). Retransmission control according to a hybrid ARQ (HARQ) is applied to a downlink shared channel (DL-SCH). Broadcast to the entire base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the physical downlink shared channel (PDSCH). The paging channel (PCH) supports DRX of the UE for enabling the UE to save power. Broadcast to the entire base station (cell) is required. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in part [B] of FIG. 5 is limited to control information. There is a collision risk. The RACH is mapped to the physical random access channel (PRACH).

The HARQ is described. The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system include "chase combining". In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. Part [A] of FIG. 6 shows mapping between a downlink logical channel and a downlink transport channel. Part [B] of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a UE. The PCCH that is a logical channel is mapped to the paging channel (PCH) that is a transport channel. A common control channel (CCCH) is a channel for transmission control information between UEs and a base station. The CCCH is used in a case where the UEs have no RRC connection with the network. In downlink, the CCCH is mapped to the downlink shared channel (DL-SCH) that is a transport channel. In uplink, the CCCH is mapped to the UL-SCH that is a transport channel.

A multicast control channel (MCCH) is a downlink channel for point-to-multipoint transmission. The MCCH is a channel used for transmission of MBMS control information for one or several MTCHs from a network to a UE. The MCCH is a channel used only by a UE during reception of the MBMS. The MCCH is mapped to the downlink shared channel (DL-SCH) or multicast channel (MCH) that is a transport channel. A dedicated control channel (DCCH) is a channel that transmits dedicated control information between a UE and a network. The DCCH is mapped to the uplink shared channel (UL-SCH) in uplink and mapped to the downlink shared channel (DL-SCH) in downlink. A dedicated traffic channel (DTCH) is a point-to-point communication channel for transmission of user information to a dedicated UE. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a UE. The MTCH is a channel used only by a UE during reception of the MBMS. The MTCH is mapped to the downlink shared channel (DL-SCH) or multicast channel (MCH).

GCI represents a global cell identity. A closed subscriber group (CSG) cell is introduced in the LTE and universal mobile telecommunication system (UMTS). The CSG is described below (Chapter 3.1 of Non-Patent Document 3). The closed subscriber group (CSG) is a cell in which subscribers who are allowed to use are identified by an operator (cell for identified subscribers). The identified subscribers are allowed to access one or more E-UTRAN cells of a public land mobile network (PLMN). One or more E-UTRAN cells in which the identified subscribers are allowed to access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access permission information. The CSG-ID is broadcast by the CSG cell or cells. A plurality of CSG-IDs exist in a mobile communication system. The CSG-IDs are used by UEs for making access from CSG-related members easier. The locations of UEs are traced based on an area composed of one or more cells. The locations are traced for enabling tracing of the locations of UEs and calling (calling of UEs) even in an idle state. An area for tracing locations of UEs is referred to as a tracking area. A CSG whitelist is a list stored in the USIM in which all CSG IDs of the CSG cells to which the subscribers belong are recorded. The CSG whitelist is also referred to as an allowed CSG ID list in some cases.

A "suitable cell" is described below (Chapter 4.3 of Non-Patent Document 3). The "suitable cell" is a cell on which a UE camps to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) above; (c) the cell shall fulfill the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 3). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has selected a cell for monitoring the system information and paging information.

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 4 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode is the cell that supports both the open access mode and the closed access mode. The cell in the hybrid access mode is also referred to as a hybrid cell.

PRIOR ART DOCUMENTS

Non-Patent Documents

Non-Patent Document 1: 3GPP TS36.300 V9.0.0 Chapter 4.6.1, Chapter 4.6.2, Chapter 5 and Chapter 6
Non-Patent Document 2: 3GPP R1-072963
Non-Patent Document 3: TS36.304 V8.6.0 Chapter 3.1, Chapter 4.3 and Chapter 5.2.4.8.1
Non-Patent Document 4: 3GPP S1-083461
Non-Patent Document 5: 3GPP R2-082899
Non-Patent Document 6: 3GPP TS22.220 V9.1.1
Non-Patent Document 7: 3GPP R2-093950
Non-Patent Document 8: 3GPP R3-091053
Non-Patent Document 9: 3GPP TS36.331
Non-Patent Document 10: 3GPP TS36.101

SUMMARY OF INVENTION

Problem to be Solved by the Invention

Studied as the HeNB (HNB) service is an operation in which CSG members belonging to the same CSG are favored in terms of service and account setting in the CSG cell.

In order to allow the CSG members to receive those benefits, a UE who is a member of a CSG needs to favor the access to the cell of the same CSG to which the UE belongs over the access to the other cells. It is conceivable that the preferential access of the UE who is a CSG member may also be applicable to a hybrid cell. The hybrid cell is a CSG cell where CSG members as well as non-CSG members are allowed access at the same time. Therefore, at the hybrid cell, the access of CSG members who make access in a closed access mode needs to be favored over the access of non-CSG members who make access in an open access mode.

3GPP proposes that, as the method of preferentially allowing CSG members access in a hybrid cell, UEs being CSG members are favored in cell reselection to a hybrid cell or from a hybrid cell, to thereby cause the UEs being CSG members to stay longer at a hybrid cell than the UEs being non-CSG members (Non-Patent Document 7).

As another method, it is also proposed to redirect UEs being non-CSG members to another cell in a case where a hybrid cell is congested (Non-Patent Document 8).

As proposed in Non-Patent Document 7 by 3GPP as the method of preferentially allowing the CSG members access at a hybrid cell, if the UEs being CSG members are favored in cell reselection to a hybrid cell or from a hybrid cell so as to stay longer at a hybrid cell than the UEs being non-CSG members, at times, the coverage in the closed access mode becomes larger than the coverage in the open access mode. In such a case, there occurs an area in which the UEs being CSG members and the UEs being non-CSG members have different access destinations, which causes a high degree of interference due to the access of both UEs. The interference increases a possibility that UEs being CSG members as well as UEs being non-CSG members present in this area may result in access failure, and at worst, communication is not allowed in some cases. This problem is not described in any prior document, and 3GPP has not discussed the problem at all.

An object of the present invention is to provide a mobile communication system capable of eliminating a communication area in which a base station serving as an access destination differs between UEs in a closed mode and UEs in an open mode.

Means to Solve the Problem

The present invention relates to a mobile communication system hybridly allowing, in a case where an access group consisting of one or more user equipments and one or more base stations is registered, the base station included in the access group to have access in a closed mode from the user equipment included in the same access group and access in an open mode from a user equipment that is not included in the same access group,
wherein a communication area of the base station in the open mode is identical to a communication area of the base station in the closed mode.

Effects of the Invention

According to the present invention, a communication area of a base station in an open mode and a communication area of a base station in a closed mode are made identical to each other, which eliminates a communication area in which a base station serving as an access destination differs between user equipments in the closed mode and user equipments in the open mode, leading to a significant reduction of interference.

BRIEF DESCRIPTION OF DRAWINGS

FIG. 1 is a diagram illustrating the configuration of an LTE communication system.
FIG. 2 is a diagram illustrating the configuration of a radio frame used in the LTE communication system.
FIG. 5 is a diagram illustrating transport channels used in the LTE communication system.
FIG. 6 is a diagram illustrating logical channels used in the LTE communication system.
FIG. 10 is a block diagram showing the configuration of an MME according to the present invention.
FIG. 11 is a block diagram showing the configuration of a HeNBGW according to the present invention.
FIG. 13 is a conceptual diagram in a case where UEs being CSG members are caused to stay longer at a hybrid cell than UEs being non-CSG members.

EMBODIMENTS FOR CARRYING OUT THE INVENTION

First Embodiment

Figure 3:
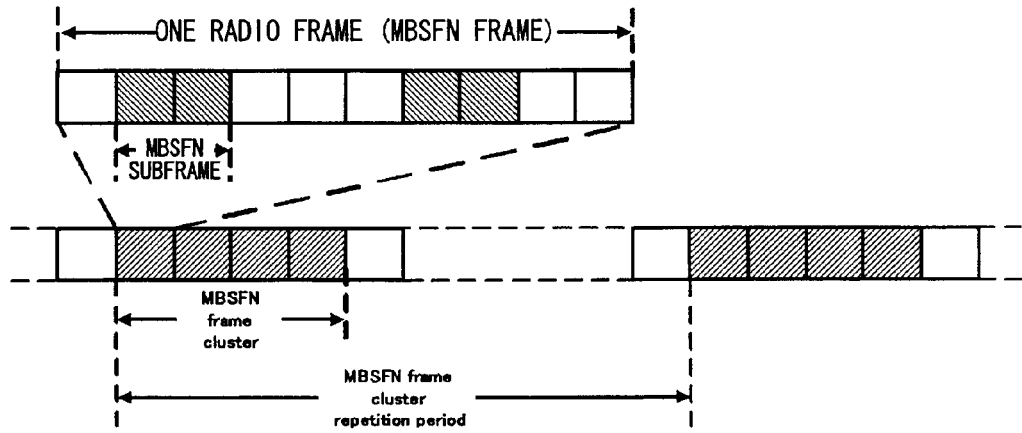
FIG. 3 is a diagram illustrating the configuration of a multimedia broadcast multicast service single frequency network (MBSFN) frame.
Figure 4:
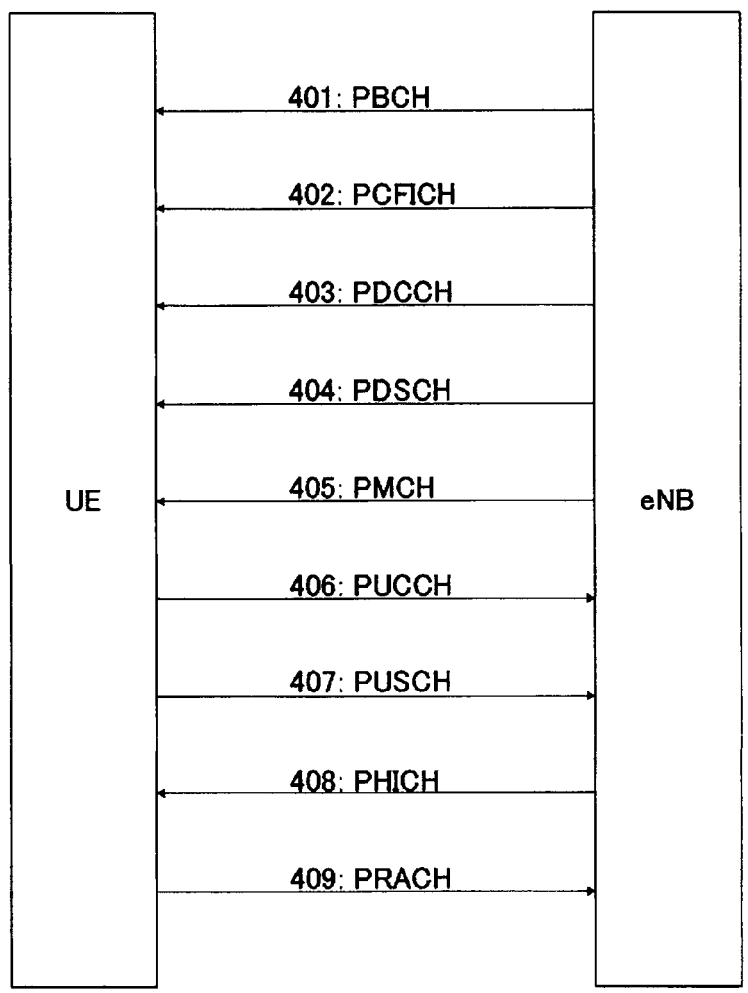
FIG. 4 is a diagram illustrating physical channels used in the LTE communication system.
Figure 7:
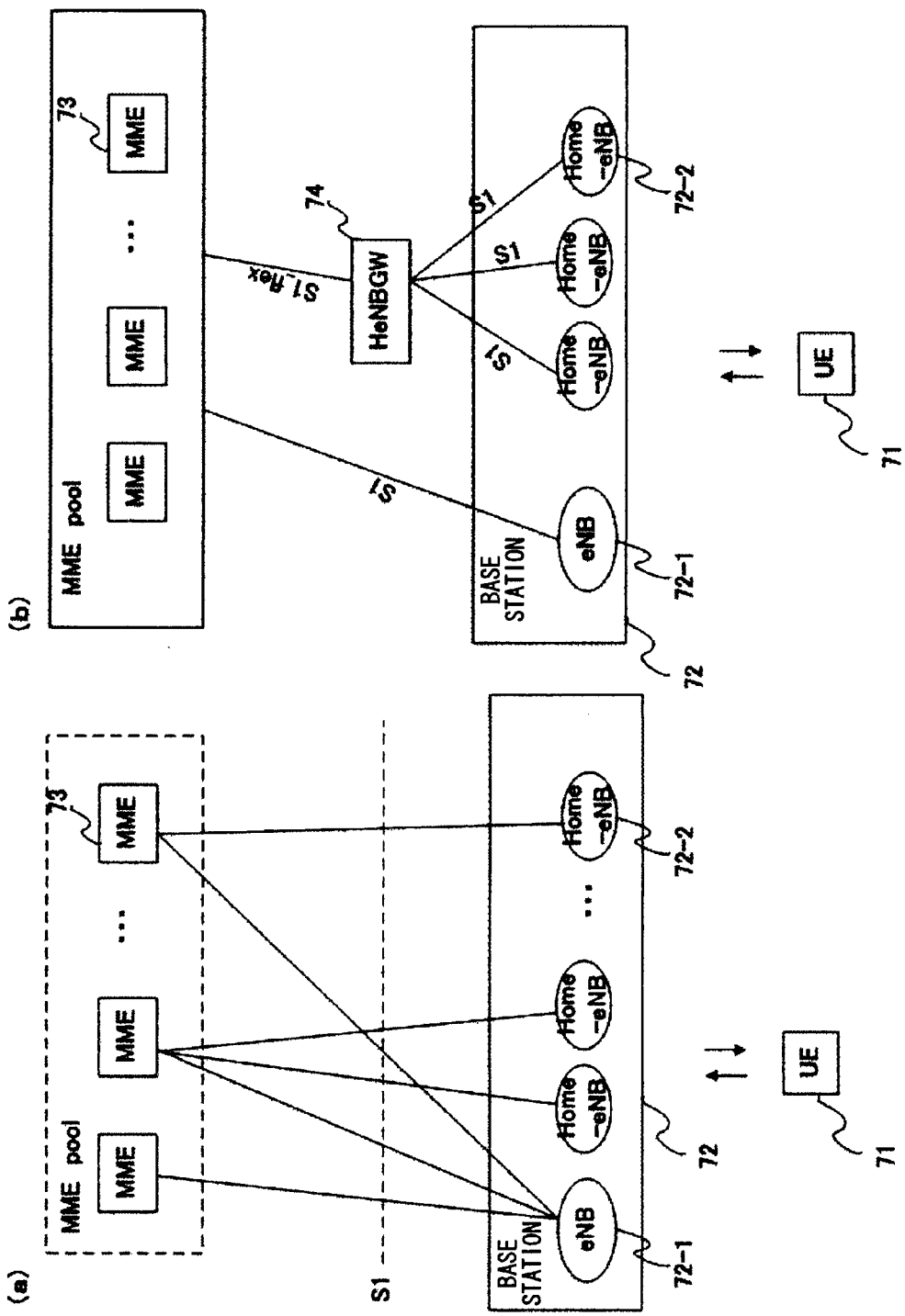
FIG. 7 is a block diagram showing the overall configuration of a mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB))

of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing the configuration of FIG. 7 (Chapter 4.6.1 of Non-Patent Document 1).

FIG. 7 is described. A user equipment (UE) 71 performs transmission/reception to/from a base station 72. The base stations 72 are classified into an eNB (non-CSG cell) 72-1 and Home-eNBs (CSG cells) 72-2. The eNB 72-1 is connected to MMEs 73 through S1 interfaces, and control information is communicated between the eNB and the MMEs. A plurality of MMEs 73 are connected to one eNB 72-1. The eNBs are connected to each other by means of an X2 interface, and control information is communicated between the eNBs.

The Home-eNB 72-2 is connected to the MME 73 by means of the S1 interface, and control information is communicated between the Home-eNB and the MME. A plurality of Home-eNBs are connected to one MME. While, the Home-eNBs 72-2 are connected to the MMEs 73 through a Home-eNB Gateway (HeNBGW) 74. The Home-eNBs are connected to the HeNBGW by means of the S1 interfaces, and the HeNBGW 74 is connected to the MMEs 73 through an S1 interface. One or a plurality of Home-eNBs 72-2 are connected to one HeNBGW 74, and information is communicated therebetween through the S1 interface. The HeNBGW 74 is connected to one or a plurality of MMEs 73, and information is communicated therebetween through the S1 interface.

Further, 3GPP is currently studying the configuration below. The X2 interface between the Home-eNBs 72-2 is not supported. The HeNBGW 74 appears to the MME 73 as the eNB 72-1. The HeNBGW 74 appears to the Home-eNB 72-2 as the MME 73. The S1 interface between the Home-eNB 72-2 and the EPC is the same irrespective of whether or not the Home-eNB 72-2 is connected to the EPC through the HeNBGW 74. The mobility to the Home-eNB 72-2 or the mobility from the Home-eNB 72-2 that spans the MMEs 73 is not supported. The Home-eNB 72-2 supports a single cell.

Figure 8:
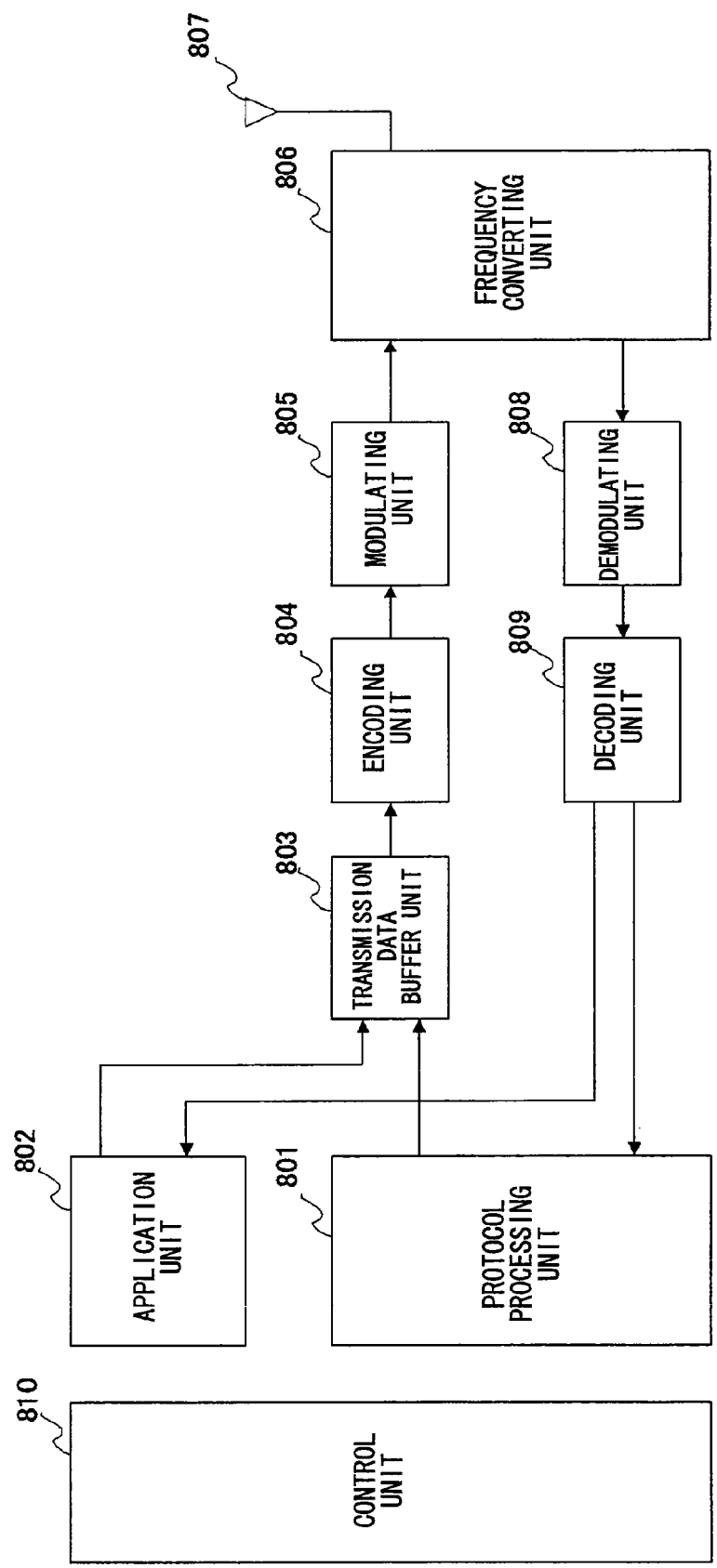
FIG. 8 is a block diagram showing the configuration of a user equipment 71 according to the present invention.

FIG. 8 is a block diagram showing the configuration of the UE (equipment 71 of FIG. 7) according to the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 72. A UE 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the UE is controlled by a control unit 810. This means that, though not shown, the control unit 810 is connected to the respective units (801 to 809).

Figure 9:
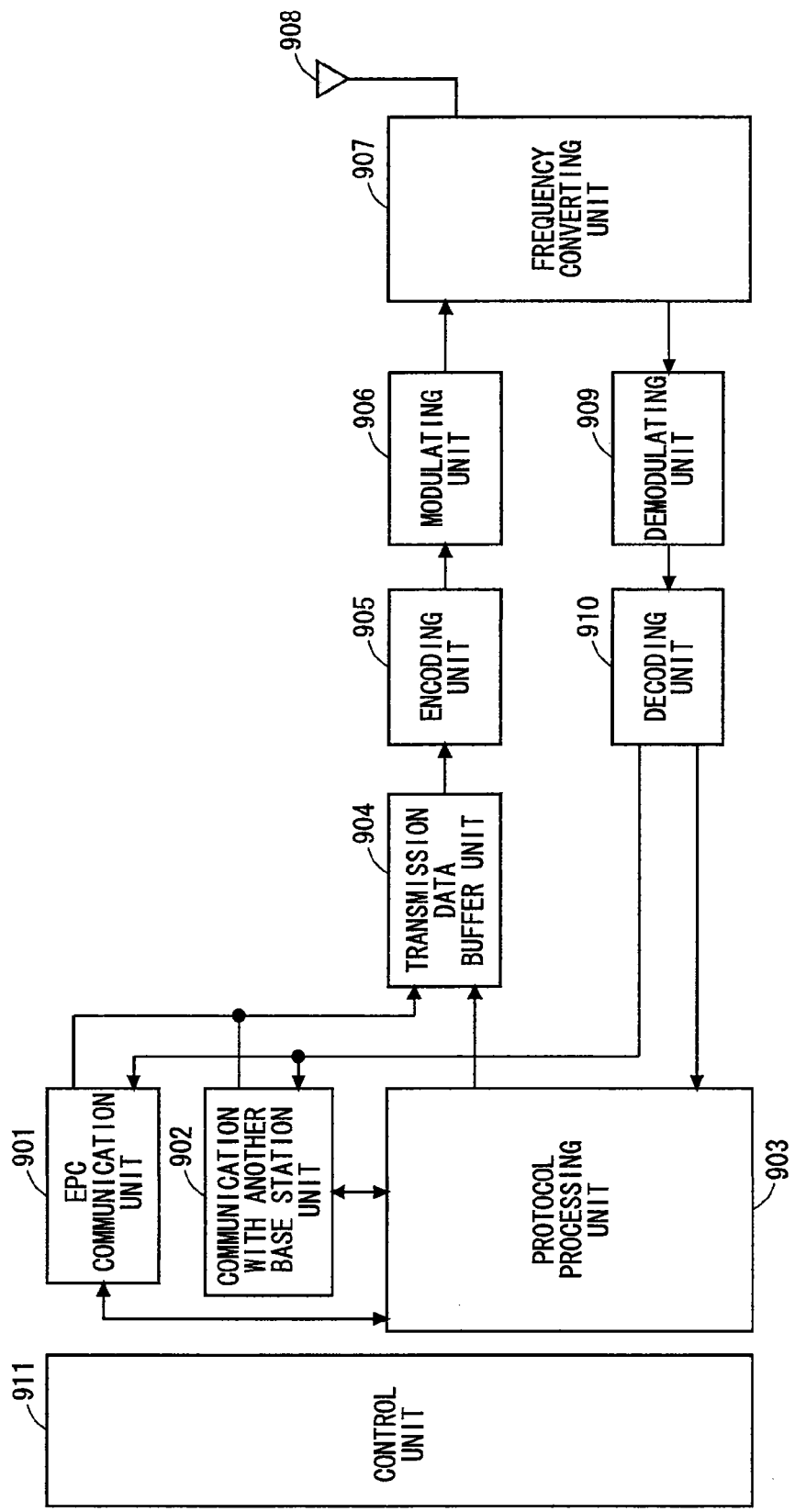
FIG. 9 is a block diagram showing the configuration of a base station 72 according to the present invention.

FIG. 9 is a block diagram showing the configuration of the base station (base station 72 of FIG. 7) according to the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of UEs 71. While, the reception process of the base station 72 is executed as follows. A radio signal from one or a plurality of UEs 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

The functions of the Home-eNB 72-2 currently under discussion of 3GPP are described below (Chapter 4.6.2 of Non-Patent Document 1). The Home-eNB 72-2 has the same function as that of the eNB 72-1 and, further, has the following function in a case of connection to the HeNBGW 74. The Home-eNB 72-2 has a function of discovering a suitable serving HeNBGW 74. In a case where the Home-eNB 72-2 is connected to one HeNBGW 74 only, that is, in a case of connection to the HeNBGW 74, the Home-eNB 72-2 does not use the Flex function of the S1 interface. When the Home-eNB 72-2 is connected to the HeNBGW 74, it is not simultaneously connected to another HeNBGW 74 or another MME 73. The TAC and PLMN ID used by the Home-eNB 72-2 are supported by the HeNBGW 74. When the Home-eNB 72-2 is connected to the HeNBGW 74, selection of the MME 73 at "UE attachment" is performed by the HeNBGW 74 instead of the Home-eNB 72-2. The Home-eNB 72-2 may be deployed without network planning. Accordingly, the Home-eNB 72-2 may be moved from one geographical area to another geographical area, and accordingly, may be required to be connected to a different HeNBGW 74 depending on its location.

FIG. 10 is a block diagram showing the configuration of a mobility management entity (MME) according to the present invention. A PDN GW communication unit 1001 performs data transmission/reception between an MME 73 and a PDN GW. A base station communication unit 1002 performs data transmission/reception between the MME 73 and the base station 72 by means of the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by means of the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signaling in an idle state, addition, deletion, update and search of a tracking area (TA) of one or a plurality of UEs 71 being served thereby, and TA list management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or searched). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or searched). For example, one or a plurality of CSG-IDs with which user registration has been performed by a UE may be stored in the whitelist. The above-mentioned management related to the CSG may be performed by another part of the MME 73. A series of process by an MME 73 is controlled by a control unit 1006. This means that, though not shown, the control unit 1006 is connected to the respective units (1001 to 1005).

The function of the MME 73 currently under discussion of 3GPP is described below (Chapter 4.6.2 of Non-Patent Document 1). The MME 73 performs access control for one or a plurality of UEs being members of closed subscriber groups (CSGs). It is allowed for the MME 73 to perform paging optimization as an option.

FIG. 11 is a block diagram showing the configuration of the HeNBGW according to the present invention. An EPC communication unit 1101 performs data transmission/reception between the HeNBGW 74 and the MME 73 by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown, the control unit 1104 is connected to the respective units (1101 to 1103).

The function of the HeNBGW 74 currently under discussion of 3GPP is described below (Chapter 4.6.2 of Non-Patent Document 1). The HeNBGW 74 relays an S1 application. The HeNBGW 74 terminates S1 application procedures toward the Home-eNB 72-2 and towards the MME 73 that are not associated with the UE 71. When the HeNBGW 74 is deployed, the procedure that is not associated with the UE 71 is communicated between the Home-eNB 72-2 and the HeNBGW 74 and between the HeNBGW 74 and the MME 73. The X2 interface is not set between the HeNBGW 74 and another node. The HeNBGW 74 recognizes the execution of paging optimization as an option.

Figure 12:
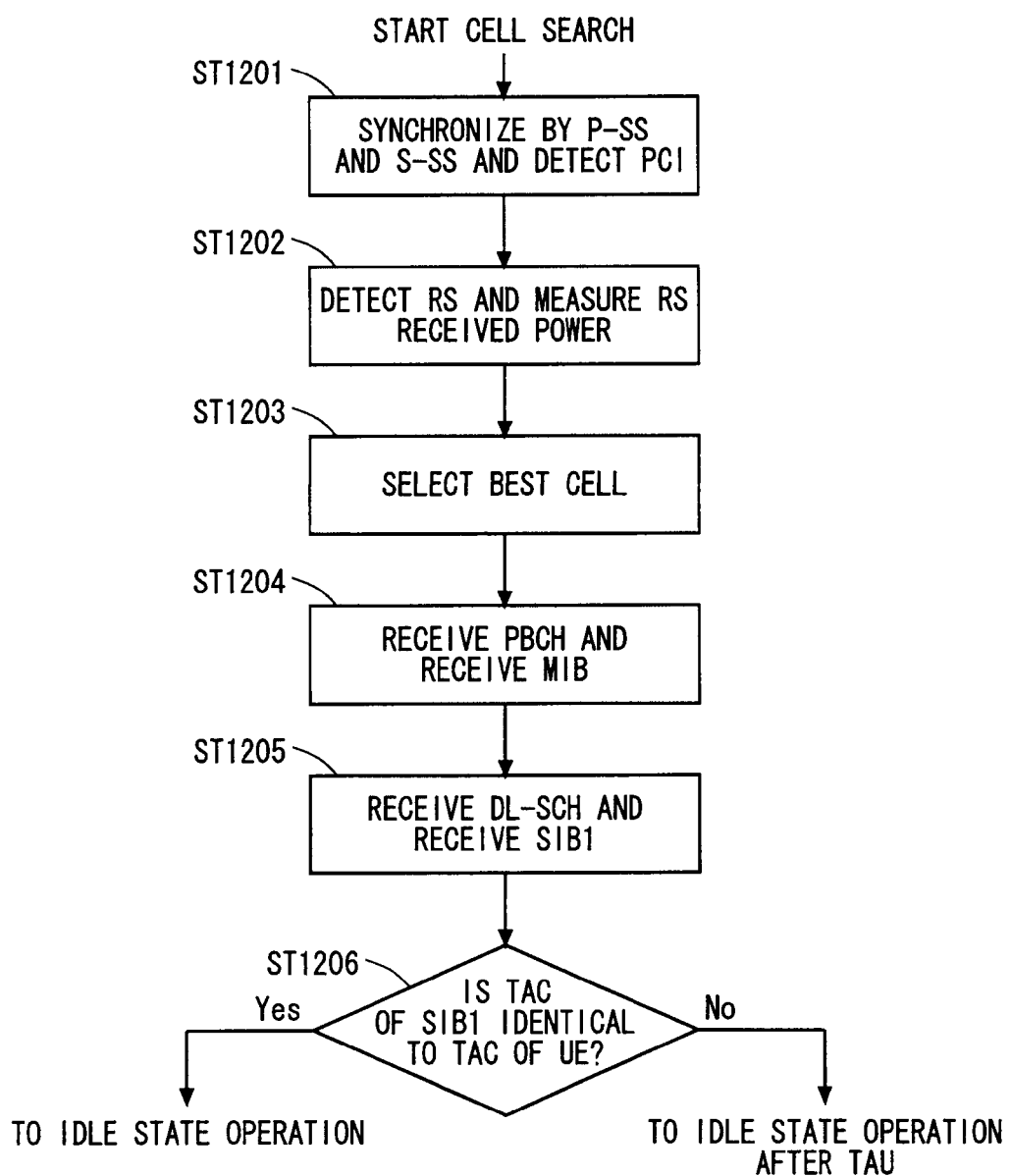
FIG. 12 is a flowchart showing an outline of cell search performed by a user equipment (UE) in the LTE communication system.

Next, an example of a typical cell search method in a mobile communication system is described. FIG. 12 is a flowchart showing an outline from cell search to idle state operation performed by a user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from another cell is enabled by correlation using the code. The code for RS of the cell is derived from the PCI identified in Step ST1201, which makes it possible to detect the RS and measure the RS received power. Next, in Step ST1203, the cell having the best RS reception quality (for example, cell having the highest RS received power; best cell) is selected from one or more cells that have been detected up to Step ST1202. In Step ST1204, next, the PBCH of the best cell is received, and the BCCH that is the broadcast information is obtained. A master information block (MIB) containing the cell configuration information is mapped on the BCCH over the PBCH. Examples of the MIB information include the down link (DL) system bandwidth (also referred to as transmission bandwidth configuration (dl-bandwidth)), transmission antenna number and system frame number (SFN).

In Step ST1205, next, the DL-SCH of the cell is received based on the cell configuration information of the MIB, to thereby obtain a system information block (SIB) 1 of the broadcast information BCCH. The SIB1 contains the information related to access to the cell, information related to cell selection and scheduling information of other SIB (SIBk; k is an integer equal to or larger than 2). In addition, the SIB1 contains a tracking area code (TAC). In Step ST1206, next, the UE compares the TAC received in Step ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU received signal to the UE. The UE rewrites (updates) the TAC (or TAC list) of the UE with the TAC of the cell. After that, the UE enters the idle state operation in the cell.

In the LTE and universal mobile telecommunication system (UMTS), the introduction of a closed subscriber group (CSG) cell is studied. As described above, access is allowed for only one or a plurality of UEs registered with the CSG cell. One or a plurality of UEs registered with the CSG cell constitute one CSG. A specific identification number referred to as CSG-ID is added to the thus constituted CSG. Note that one CSG may contain a plurality of CSG cells. After being registered with any one of the CSG cells, the UE can access the other CSG cells of the CSG to which the registered CSG cell belongs. Alternatively, the Home-eNB in the LTE or the Home-NB in the UMTS is used as the CSG cell in some cases. The UE registered with the CSG cell has a whitelist. Specifically, the whitelist is stored in the SIM/USIM. The CSG information of the CSG cell with which the UE has been registered is listed in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID, TAC and global cell identity (GCI) are associated with each other. As can be seen from the above, the UE which does not have a whitelist (including a case where the whitelist is empty in the present invention) is not allowed to access the CSG cell but is allowed to access only the non-CSG cell. On the other hand, the UE which has a whitelist is allowed to access the CSG cell of the CSG-ID with which registration has been performed as well as the non-CSG cell.

3GPP discusses that all physical cell identities (PCIs) are split (referred to as PCI-split) into ones reserved for CSG cells and the others reserved for non-CSG cells (Non-Patent Document 5). Further, 3GPP discusses that the PCI split information is broadcast in the system information from the base station to the UEs being served thereby. Disclosed here is the basic operation of a UE by PCI split. The UE that does not have the PCI split information needs to perform cell search using all PCIs (for example, using all 504 codes). On the other hand, the UE that has the PCI split information is capable of performing cell search using the PCI split information.

3GPP allows temporary CSG members. A temporary member is also referred to as a temporary member or visitor. It is possible to configure a time period for a temporary member to be considered as a CSG member (Non-Patent Document 6).

In 3GPP, there are two modes in the method of selecting or reselecting a CSG cell by a UE. One is an automatic mode. The feature of the automatic mode is described below. The UE performs selection or reselection with the use of an allowed CSG ID list in the UE. After the completion of PLMN selection, the UE camps on one cell in the selected PLMN only in a case of a non-CSG cell or a CSG cell with a CSG ID present in the allowed CSG list. The UE disables an autonomous search function of the CSG cell if the allowed CSG list of the UE is empty (Chapter 5.2.4.8.1 of Non-Patent Document 3).

The second is a manual mode. The feature of the manual mode is described below. The UE shows a list of available CSGs in the currently selected PLMN. The list of CSGs provided to the user by the UE is not limited to the CSGs included in the allowed CSG list stored in the UE. The user selects the CSG based on the list of CSGs, and then the UE camps on the cell with the selected CSG ID, to thereby attempt registration (Chapter 5.2.4.8.1 of Non-Patent Document 3).

Non-Patent Document 7 proposed by 3GPP discloses, as the method of preferentially allowing access to CSG members at a hybrid cell, the technique in which UEs being CSG members are favored in cell reselection to a hybrid cell or from a hybrid cell to another cell or cell reselection from another cell to a hybrid cell, to thereby cause the UEs being CSG members to stay longer at a hybrid cell than UEs being non-CSG members. As a result of UEs being CSG members being caused to stay longer at a hybrid cell than UEs being non-CSG members, the coverage in a closed access mode becomes larger than the coverage in an open access mode in some cases.

FIG. 13 is a conceptual diagram in a case where UEs being CSG members are caused to stay longer at a hybrid cell than UEs being non-CSG members. In the diagram, 1301 denotes a non-CSG cell, which is a macro cell (eNB) as an example in this case. 1302 denotes the coverage of the non-CSG cell. 1303 denotes a hybrid cell (HeNB in a hybrid access mode). 1304 denotes the coverage accessible at the hybrid cell in an open access mode as well as a closed access mode. 1305 (shaded portion) denotes the coverage accessible at the hybrid cell only in the closed access mode. 1306 denotes a UE being the member of the same CSG as the CSG to which the hybrid cell belongs. 1307 denotes a UE being a non-CSG member. The UE being a CSG member communicates with the non-CSG cell 1301 out of the area of the coverage 1305, and the UE 1306 that has moved to the area of the coverage 1305 communicates with the hybrid cell 1303 through cell reselection. The UE 1307 being a non-CSG member still communicates with the non-CSG cell 1301 also in the area of the coverage 1305, and communicates with the hybrid cell 1303 through cell reselection only after moving to the coverage 1304.

In this manner, if the UEs being CSG members are caused to stay longer at a hybrid cell than the UEs being non-CSG members, correspondingly, the coverage in the closed access mode becomes larger than the coverage in the open access mode in some cases. This is because there occurs an area in which only the UEs being CSG members are allowed to access the hybrid cell. In such an area (shaded portion in the diagram), the UEs being CSG members access the hybrid cell, whereas the UEs being non-CSG members access the other cell (in the diagram, macro cell). An interference problem as described below occurs in the situation in which such an area occurs.

Figure 14:
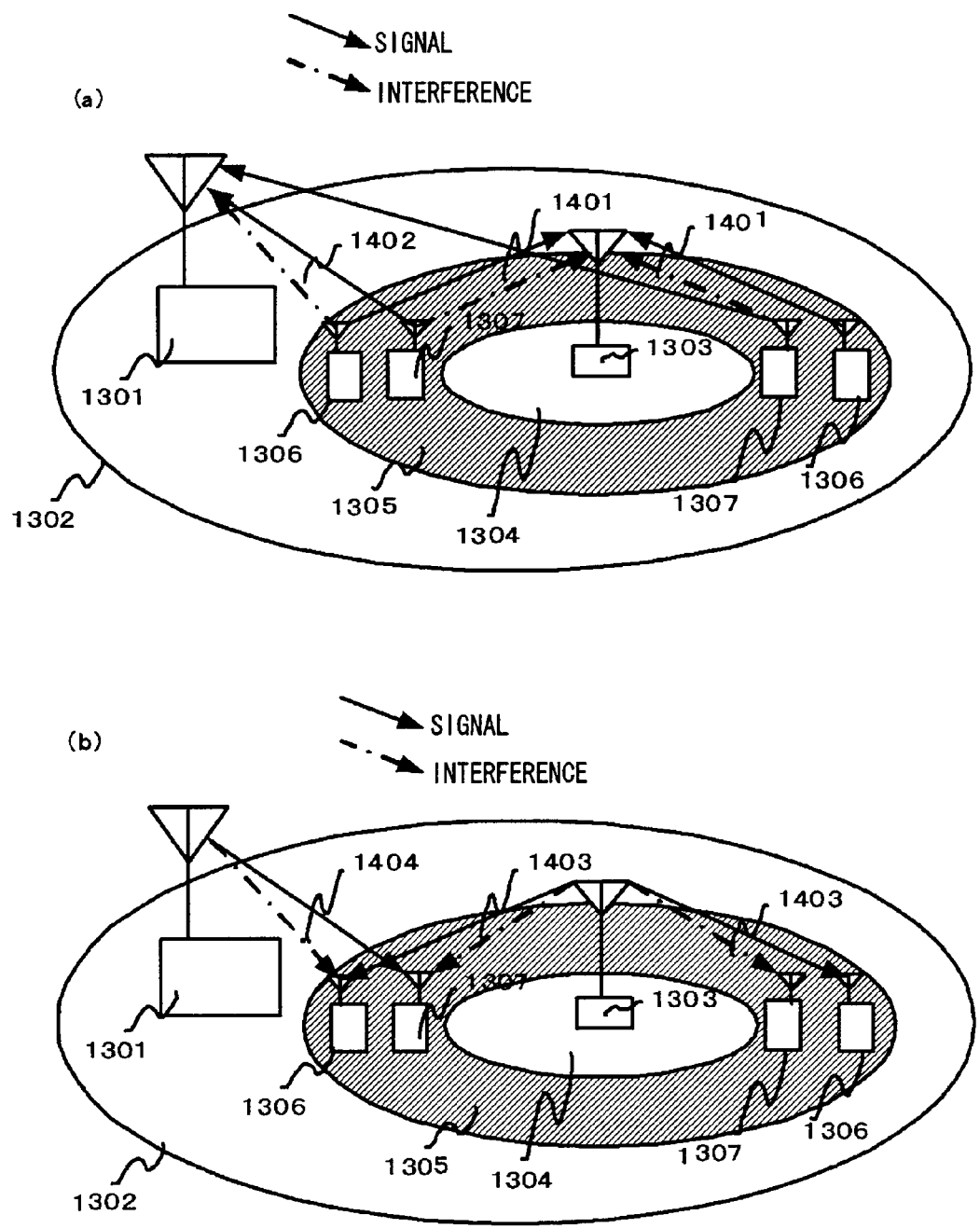
FIG. 14 is a conceptual diagram of interference occurring in an area in which only UEs being CSG members are allowed access.

FIG. 14 is a conceptual diagram of the interference occurring in the area in which only UEs being CSG members are allowed access. Part (a) of FIG. 14 shows the interference occurring in uplink communication, and Part (b) of FIG. 14 shows the interference occurring in downlink communication. Description of the parts denoted by the same numbers as those of FIG. 13 in FIG. 14 is omitted. In the diagram, a solid arrow indicates a signal and a dotted arrow indicates interference.

Part (a) of FIG. 14 is described. In the area (shaded portion in the diagram) 1305 in which only UEs being CSG members are allowed to access a hybrid cell, the UE (1306) being a CSG member accesses the hybrid cell (1303), and the UE (1307) being a non-CSG member accesses the macro cell (1301). This causes the interference described below in uplink communication. An uplink signal wave from the UE (1307) being a non-CSG member to the macro cell (1301) causes interference to an uplink signal wave of the UE (1306) being a CSG member being served by a hybrid cell (1401). An uplink signal wave from the UE (1306) being a CSG member to the hybrid cell (1303) causes interference to an uplink signal wave of the UE (1307) being a non-CSG member being served by a macro cell (1402).

Part (b) of FIG. 14 is described. In the area (shaded portion in the diagram) 1305 in which only UEs being CSG members are allowed to access a hybrid cell, the UE (1306) being a CSG member accesses the hybrid cell (1303), and the UE (1307) being a non-CSG member accesses the macro cell (1301). This causes the interference described below in downlink communication. A downlink signal wave from the hybrid cell (1303) to the UE (1306) being a CSG member causes interference to a downlink signal wave of the UE (1307) being a non-CSG member being served by a macro cell (1403). A downlink signal wave from the macro cell (1301) to the UE (1307) being a non-CSG member causes interference to a downlink signal wave to the UE (1306) being a CSG member being served by the hybrid cell (1404).

In this manner, in the area in which only UEs being CSG members are allowed access, a high degree of interference occurs by the access of both UEs when the access destination differs between UEs being CSG members and UEs being non-CSG members. The interference increases a possibility that UEs being CSG members as well as UEs being non-CSG members present in this area may fail in access, and further, communication may not be allowed in some cases. In other words, there occurs an area in which communication becomes impossible for UEs being CSG members and/or UEs being non-CSG members. This problem is not described in any prior document, and 3GPP has not discussed the problem at all.

The present embodiment discloses the method of solving the above-mentioned problem. At the hybrid cell, the coverage for UEs being non-CSG members is made identical to the coverage for UEs being CSG members. In other words, the communication area of a cell (base station) in an open access mode is made identical to the communication area of a cell (base station) in a closed access mode. As a specific method, parameters that define the coverage used at the hybrid cell are made identical to each other between UEs being non-CSG members and UEs being CSG members. Alternatively, the same parameter values are applied to both UEs (UEs being CSG members and UEs being non-CSG members). Examples of the parameters regarding the coverage used at a hybrid cell include the maximum transmission power from a cell, a tilt angle of an antenna of a cell and the maximum allowed transmission power of each UE being served by a cell. The maximum allowed transmission power of a UE is a parameter that enables to limit the uplink transmission power of a UE, as described in Non-Patent Document 10.

Figure 24:
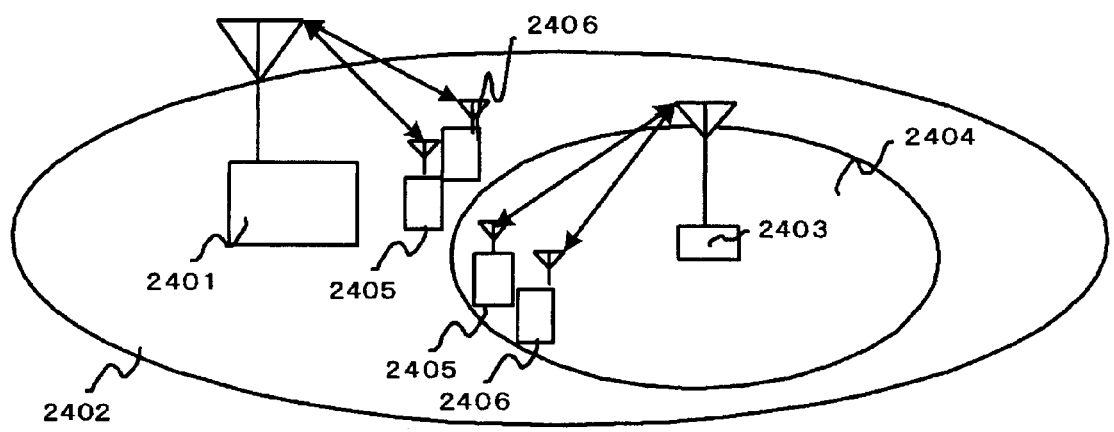
FIG. 24 is a conceptual diagram in a case where the coverage for UEs being non-CSG members is made identical to the coverage for UEs being CSG members.

FIG. 24 is a conceptual diagram in a case where the coverage for UEs being non-CSG members is made identical to the coverage for UEs being CSG members. In the diagram, 2401 denotes a non-CSG cell, which is a macro cell (eNB) here. 2402 denotes the coverage of the non-CSG cell. 2403 denotes a hybrid cell (HeNB in a hybrid access mode). 2404 denotes the coverage accessible at the hybrid cell in an open access mode as well as a closed access mode. 2405 denotes a UE being the member of the same CSG as the CSG to which the hybrid cell belongs. 2406 denotes a UE being a non-CSG member.

The macro cell (2401) is not a cell in a hybrid access mode similarly to a hybrid cell but is a cell only in an open access mode. For this reason, one coverage is provided for the macro cell (2401) no matter which a UE is being served by the macro cell (2401) (2402). In this case, similarly also at the hybrid cell (2403), one coverage is provided for the hybrid cell (2403) no matter which a UE is being served thereby (2404).

Through the above, the UE (2405) being a CSG member and the UE (2406) being a non-CSG member communicate with the non-CSG cell (2401) outside the coverage (2404) of the hybrid cell (2403). On the other hand, within the coverage (2404) of the hybrid cell, the UE (2405) being a CSG member and the UE (2406) being a non-CSG member communicate with the hybrid cell (2403). Accordingly, it is possible to eliminate the area in which the access destination differs between the UEs being CSG members and UEs being non-CSG members as shown in part (a) of FIG. 14 and part (b) of FIG. 14, which eliminates uplink and/or downlink interference occurring in the area.

The method disclosed in the present embodiment enables to eliminate the area in which UEs being CSG members and/or UEs being non-CSG members cannot perform communication in a case where a hybrid cell is deployed in a system. Accordingly, a hybrid cell can be deployed flexibly in the system, which allows the provision of various services.

The control processing at a hybrid cell can be simplified by making the parameters that define the coverage used at the hybrid cell identical to each other between UEs being non-CSG members and UEs being CSG members or by applying the same parameter values to both UEs. In addition, owing to application of the same parameter values to both UEs, control is not required to differ depending on a parameter, leading to simplification of control processing in a UE as well. Further, the number of parameters at a hybrid cell can be reduced, and the number of parameters that need to be notified to UEs being served thereby can be reduced as well, leading to a reduction of a signaling amount. This achieves effects such as effective use of radio resources.

Second Embodiment

The present embodiment discloses another method for solving the above-mentioned problem. In cell reselection from a hybrid cell to another cell and cell reselection from another cell to a hybrid cell, the criteria such as the procedures, rules and a cell ranking criteria of the reselection are made identical to each other between UEs being non-CSG members and UEs being CSG members. As a specific method, the parameters that define the criteria used in cell reselection from a hybrid cell to another cell and cell reselection from another cell to a hybrid cell are made identical to each other between both UEs, or the same parameter values are used therebetween. Examples of the parameters that define the criteria used in cell reselection from a hybrid cell to another cell and cell reselection from another cell to a hybrid cell include reception quality thresholds (Sintrasearch, Sintersearch) of a serving cell for initiating cell reselection and an offset value (Qoffset) applied to the measurement results of the reception quality of the cell in the criteria of cell ranking.

Figure 25:
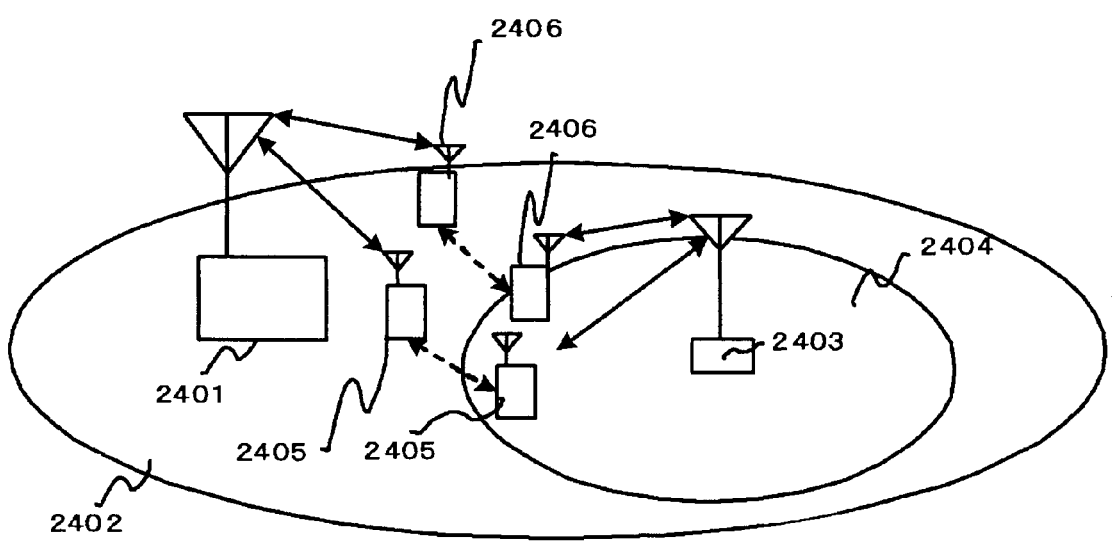
FIG. 25 is a conceptual diagram in a case where the cell reselection procedures to/from a hybrid cell are made identical to each other between UEs being non-CSG members and UEs being CSG members.

FIG. 25 is a conceptual diagram in a case where the cell reselection criteria to/from a hybrid cell are made identical to each other between UEs being non-CSG members and UEs being CSG members. In the diagram, the description of the same numbers as those of FIG. 24 is omitted. If the UE (2406) being a non-CSG member being served by the macro cell (2401) and the UE (2405) being a CSG member are located at the same position, by making the criteria of cell reselection to the hybrid cell (2403) identical to each other between the UE (2406) being a non-CSG member and the UE (2405) being a CSG member, the both UEs perform cell reselection to the hybrid cell (2403) at the same position when the other environment of radio waves is the same. If the UE (2406) being a non-CSG member being served by the hybrid cell (2403) and the UE (2405) being a CSG member are located at the same position, by making the criteria of cell reselection from the hybrid cell (2403) identical to each other between the UE (2406) being a non-CSG member and the UE (2405) being a CSG member, the both UEs perform cell reselection to the macro cell (2401) at the same position when the other environment of radio waves is the same.

Accordingly, whether the UE being served by the hybrid cell (2403) is a CSG member or a non-CSG member at the hybrid cell (2403), one coverage can be provided (2404) as the hybrid cell (2403). This causes the UE (2405) being a CSG member and the UE (2406) being a non-CSG member to become capable of communicating with the non-CSG cell (2401) out of the coverage (2404) of the hybrid cell (2403). On the other hand, in the coverage (2404) of a hybrid cell, the UE (2405) being a CSG member and the UE (2406) being a non-CSG member communicate with the hybrid cell (2403). Accordingly, it is possible to eliminate the area in which the access destination differs between UEs being CSG members and UEs being non-CSG members as shown in part (a) of FIG. 14 and part (b) of FIG. 14, which eliminates uplink and/or downlink interference occurring in the area.

The method disclosed in the present embodiment enables to eliminate the area in which UEs being CSG members and/or UEs being non-CSG members cannot perform communication in a case where a hybrid cell is deployed in the system. Accordingly, a hybrid cell can be deployed flexibly in the system, which enables to provide various services.

In cell reselection to/from a hybrid cell, the control processing at a cell can be simplified by making the criteria such as the procedures, rules and a cell ranking criteria of the reselection identical to each other between UEs being non-CSG members and UEs being CSG members. In addition, the same parameter values are applied to both UEs, and thus the control is not required to differ depending on a parameter, leading to simplification of control processing in a UE as well. Further, the number of parameters used at a cell can be reduced, and the number of parameters that need to be notified to UEs being served thereby can be reduced as well, leading to a reduction of a signaling amount. This achieves an effect of such as effective use of radio resources.

Third Embodiment

The present embodiment discloses another method for solving the above-mentioned problem. The second embodiment has disclosed the case of cell reselection to/from a hybrid cell. That is, it is possible to eliminate the area in which the access destination differs between UEs being CSG members and UEs being non-CSG members for the UE in an RRC_Idle state, which eliminates uplink and/or downlink interference occurring in the area.

The present embodiment discloses the method capable of eliminating an area in which the access destination differs between UEs being CSG members and UEs being non-CSG members for a UE in an RRC_connected state, to thereby eliminate uplink and/or downlink interference occurring in the area.

In handover (outbound HO) from a hybrid cell to another cell and handover (inbound HO) from another cell to a hybrid cell, the criteria include the criteria used in the procedures, rules and a criteria of the HO are made identical to each other between the UEs being non-CSG members and the UEs being CSG members. As a specific method, the parameters that define the criteria of HO to/from a hybrid cell are made identical to each other between both UEs or the same parameter values are used. Examples of the parameters that define the criteria of HO to/from hybrid cells include parameters serving as judgment index for determining whether or not an event triggering a measurement report occurs. They include thresholds (Thresh, Thresh1, Thresh2) of event occurrence, an offset value (Ocs) of a serving cell that is applied to the measurement results of the reception quality, an offset value (Ofs) of the frequency of a serving cell that is applied to the measurement results of the reception quality, an offset value (Ocn) of neighbor cells that is applied to the measurement results of the reception quality, an offset value (Ofn) of the frequency of neighbor cells that is applied to the measurement results of the reception quality, an offset value (Off) for each event and a hysteresis (Hys) for each event.

This enables to make the coverage of hybrid cells identical to each other between the UEs being CSG members in the RRC connected state and UEs being non-CSG members in the RRC connected state. Accordingly, it is possible to eliminate the area in which the access destination differs between UEs being CSG members and UEs being non-CSG members as shown in part (a) of FIG. 14 and part (b) of FIG. 14, which eliminates uplink and/or downlink interference occurring in the area.

The method disclosed in the present embodiment can eliminate the area in which UEs being CSG members and/or UEs being non-CSG members cannot perform communication in a case where a hybrid cell is deployed in the system. This enables to flexibly deploy a hybrid cell in the system, whereby various services can be provided.

In HO to/from a hybrid cell, it is possible to simplify the control processing in the cell by making the criteria such as the procedures, rules and criteria of HO identical to each other between UEs being non-CSG members and UEs being CSG members. In addition, the same parameter values are applied to both UEs, and thus control is not required to differ depending on a parameter, which also leads to simplification of the control processing in the UE. Further, the number of parameters used in the cell can be reduced, and the number of parameters that need to be notified to UEs being served thereby can be reduced, leading to a reduction of a signaling amount. This enables to achieve effects such as effective use of radio resources.

The first embodiment to the third embodiment may be used in combination. Accordingly, it is possible to eliminate the area in which UEs being CSG members and/or UEs being non-CSG members cannot perform communication in any of the RRC-Idle state and RRC connected state of a UE or in the operation when the UE changes between the RRC-Idle state and RRC connected state.

Fourth Embodiment

The description has been given of a suggestion by 3GPP that, as another method of giving preferential access to CSG members at a hybrid cell, UEs being non-CSG members are redirected to another cell in a case where the hybrid cell is congested (Non-Patent Document 8). In addition, Non-Patent Document 8 describes that at a hybrid cell in a congested state, UEs being non-CSG members that have been in the RRC-Connected state are redirected to another cell.

However, there is no specific description regarding the way of redirection, which causes a problem that practical operations cannot be made.

The present embodiment discloses the method for solving this problem. As a specific method of redirecting the UEs being non-CSG members that have been in the RRC_Connected state to another cell, in a case where a cell receives a new RRC connection request from UEs being CSG members at a hybrid cell in a congested state, the procedure of redirecting the UEs being non-CSG members to another cell is triggered by this connection request. As a specific method of redirection, the UEs being non-CSG members are caused to hand over (HO) to another cell.

Figure 15:
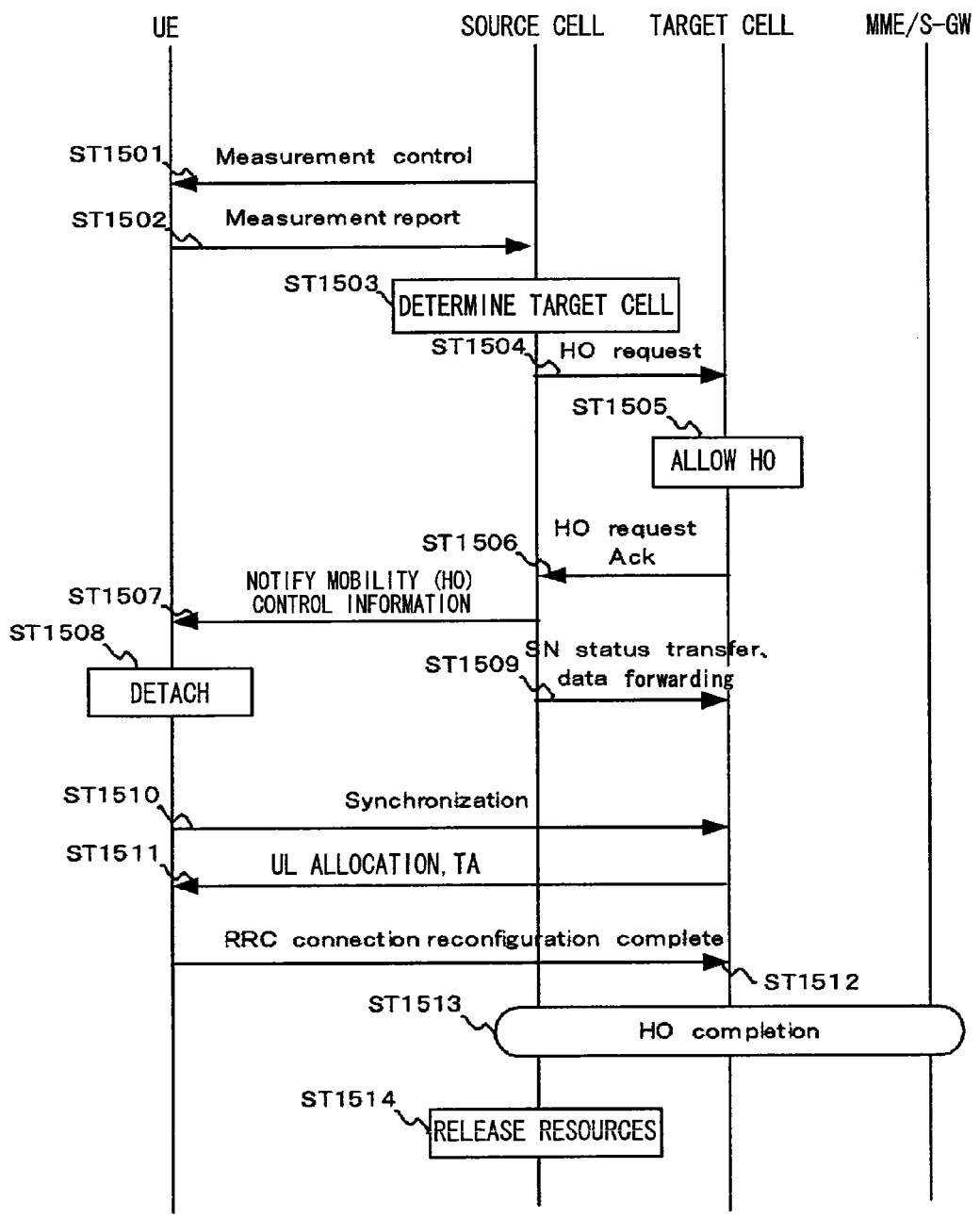
FIG. 15 shows an operation example of a normal HO procedure currently under discussion of 3GPP.

First, FIG. 15 shows an operation example of a normal HO procedure (Non-Patent Document 1). This is an example of the HO procedure discussed by 3GPP. Described here is the case in which communication between a source cell and a target cell is performed by means of an X2 interface.

In Step ST1501, a source cell notifies the UE of a measurement control message and causes the UE to perform measurement. In Step ST1502, the UE notifies the source cell of measurement results. In Step ST1503, the source cell determines a target cell with the use of a measurement report from the UE. In this manner, in normal HO, each cell judges whether or not the cell needs to cause the UE to perform HO or to which cell the cell causes the UE to perform HO, mainly based on the measurement results of the reception quality of the UE. That is, the HO procedure is triggered by the measurement report from the UE (Step ST1502).

In Step ST1504, the source cell that has determined a target cell notifies the target cell of an HO request message. The HO request message contains UE context information that is the information regarding the UE that is caused to perform HO. In Step ST1505, the target cell determines whether to cause the UE to perform HO in consideration of the state of the own cell and the information regarding the UE. Described here is the case where HO is allowed. In the case where HO is allowed, the target cell notifies an allowance message (Ack) for the HO request in Step ST1506. In Step ST1507, the source cell that has received the allowance message notifies the UE of HO control information.

In Step ST1509, the source cell notifies the target cell of the data required for continuing communication in HO and the SN status information of PDCP related thereto. The UE that has received the HO control information in Step ST1507 is detached from the source cell in Step ST1508, and in Step ST1510, performs synchronization with the target cell based on the target cell information contained in the HO control information. After the establishment of synchronization, in Step ST1511, the target cell notifies the UE of allocation information of uplink resources as well as timing advance (TA) information that is transmission timing information. In Step ST1512, the UE that has received the information notifies the target cell of an RRC connection reconfiguration complete message. As a result, data communication is started between the UE and the target cell.

In Step ST1513, the target cell that has received Step ST1512 performs the processing for HO completion with the source cell through an MME or serving GW (S-GW) being an entity of higher layer. Along with the processing for HO completion of Step ST1513, in Step ST1514, the source cell releases the resources used in control associated with the information regarding the UE.

In the HO procedure, the transmission of an HO request by the source cell in Step ST1504 through the transmission of HO control information by the source cell in Step ST1507 are treated as an HO preparation step, the detachment of the UE in Step ST1508 and the transmission of SN status information by the source cell in Step ST1509 through the reception of the RRC connection reconfiguration completion by the target cell in Step ST1512 are treated as an HO execution step, and the start of processing for HO completion in Step ST1513 and the release of resources by the source cell in Step ST1514 are treated as an HO completion step.

Figure 16:
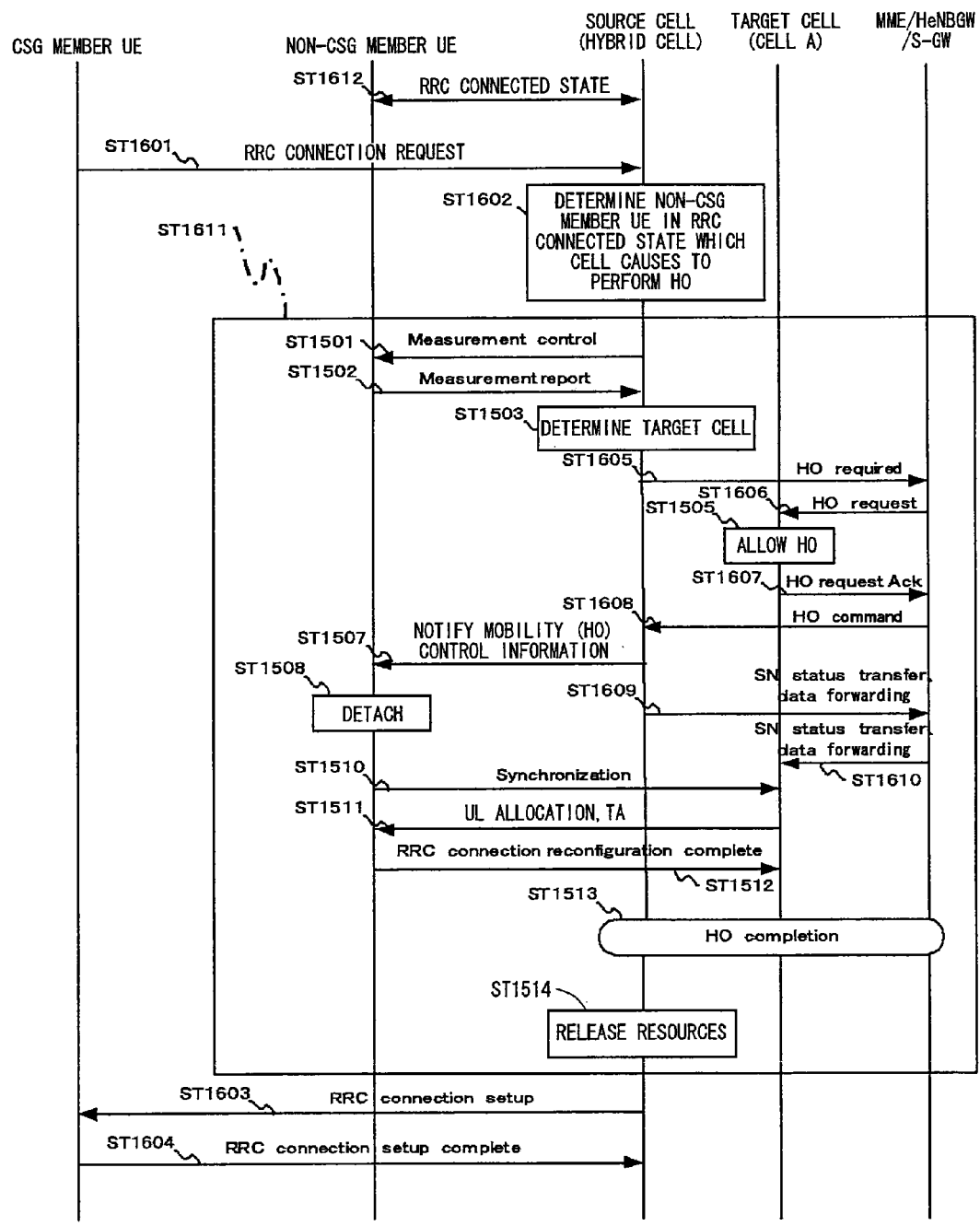
FIG. 16 shows an operation example in a case where redirection is triggered by a new RRC connection request from a UE being CSG member.

Next, a specific method in the present embodiment is disclosed. FIG. 16 shows an operation example in the case where the hybrid cell in the congested state redirects the UE being a non-CSG member to another cell in response to a new RRC connection request from the UE being a CSG member. HO is used as a specific method of redirection. In the figure, description of the parts of the same step numbers as those of FIG. 15 is omitted. In this example, the source cell is a hybrid cell. Here, the target cell is a cell A without limiting the access mode of the target cell.

The case where a non-CSG member is in the RRC connected state at a hybrid cell is described (Step ST1612). The UE being a non-CSG member may perform services such as data communication with a core network side (such as MME or S-GW) through the hybrid cell. In Step ST1601, the UE being a CSG member being served by the hybrid cell transmits an RRC connection request. In Step ST1602, the hybrid cell in a congested state that has received the RRC connection request message determines a UE being a non-CSG member in the RRC connected state which the cell redirects at the own cell. Here, HO to another cell is redirection. As described above, normal HO is triggered mainly by the measurement results of reception quality of the UE. In the present embodiment, however, HO is triggered by the reception of a new RRC connection request from the UE being a CSG member at the hybrid cell in the congested state. In addition, the connection between a UE in a closed mode and a hybrid cell (base station) is completed after the UE in an open mode is redirected (HO) to another cell (base station) from the hybrid cell (base station). This enables to start the HO procedure at the timing of a new RRC connection request of a UE being a CSG member (UE in a closed mode), leading to a reduction of a control delay until the UE being a CSG member is allowed communication.

The hybrid cell that has determined the UE being a non-CSG member which the cell causes to perform HO in Step ST1602 starts the processing of causing the UE being a non-CSG member to perform HO to another cell. The hybrid cell notifies UE being the non-CSG member of a measurement control message in Step ST1501, and in Step ST1502, the UE notifies the hybrid cell of the measurement results. Differently from the procedure shown in FIG. 15, in Step ST1605 and Step ST1606, the hybrid cell that has determined the target cell in Step ST1503 transmits a message to request an HO to the target cell through the MME. As shown in FIG. 7, in the current architecture of the HeNB by 3GPP, there is no X2 interface between cells and the HeNBs are connected to each other by means of the S1 interface through the MME, HeNBGW or S-GW. Accordingly, the message between the hybrid cell being a source cell and the target cell may be communicated through the MME/HeNBGW/S-GW. The HO request message contains the information regarding the UE to be caused to perform HO. In Step ST1505, the target cell determines whether or not to cause the UE to perform HO in consideration of the state of the own cell and the information regarding the UE. Described here is the case where HO is allowed. When HO is allowed, in Step ST1607 and Step ST1608, the target cell notifies an allowance message for the HO request through the MME or the like. This may also be performed through the MME or the like because an X2 interface is not provided. In Step ST1507, the source cell that has received the allowance message notifies the UE of the HO control information. Further, for the target cell, in Step ST1609 and Step ST1610, the source cell notifies the target cell of the data required for continuing communication in HO and the SN status information of the PDCP related thereto. The data may be notified not through the MME or HeNBGW but through the S-GW. Then, as in FIG. 15, Step ST1508 through Step ST1514 are performed.

Upon the completion of HO in Step ST1514, in Step ST1603, the hybrid cell notifies the UE being a CSG member that has requested RRC connection of an RRC connection setup message. The UE being a CSG member that has received the setup message performs setup, and in Step ST1604, notifies the hybrid cell of an RRC connection setup complete message. This enables the UE being a CSG member to be provided services such as data communication with the core network side (such as MME) through the hybrid cell.

Meanwhile, the UE being a non-CSG member notifies the target cell of the RRC connection reconfiguration complete message in Step ST1512, whereby data communication between the UE and the target cell is started. This allows the non-CSG member to perform communication at the target cell while keeping the RRC connected state.

In the specific example shown in FIG. 16, the UE notifies the hybrid cell of the measurement results in Step ST1502, and in Step ST1503, the hybrid cell determines a target cell based on that information. Step ST1501 and Step ST1502 may not be performed after the determination of a UE being a non-CSG member to be caused to perform HO in Step ST1602, not by this method. Step ST1503 is performed after Step ST1602. If the hybrid cell recognizes the cell present in the vicinity thereof, it may determine a target cell based on that. Examples of the method in which the hybrid cell recognizes the cell present in the vicinity thereof include the method of measuring the reception quality from a neighbor cell by the HeNB and using the results thereof and the method using the measurement results from another UE being served by the hybrid cell. The time period until performing redirection (HO) can be reduced by omitting Step ST1501 and Step ST1502, which makes it possible to reduce the time period until the UE being a CSG member can receive the service as a CSG member at a hybrid cell or the time period until a non-CSG member can perform communication at another cell.

While the procedure of completing RRC connection of a UE being a CSG member is performed after the completion of redirection (HO) of a UE being a non-CSG member in the example above, redirection (HO) of a UE being a non-CSG member and the RRC connection procedure of a UE being a CSG member may be performed simultaneously. This enables to complete the RRC connection procedure of the UE being a CSG member to the hybrid cell even if the redirection (HO) of a UE being a non-CSG member fails, whereby a UE being a CSG member is given preferential access.

In this manner, the RRC connection request from a UE being a CSG member is used as the trigger for the hybrid cell in a congested state to redirect a UE being a non-CSG member, whereby the UE being a CSG member can establish RRC connection at the hybrid cell and transmit/receive data to/from the network side, and accordingly can receive the services as the CSG member at the hybrid cell.

Further, also in the case where the hybrid cell in a congested state lacks resources for RRC connection, by redirecting the UE being a non-CSG member before the completion of RRC connection with an RRC connection request from a UE being a CSG member as the trigger, it is possible to redirect the UE being a non-CSG member and allow RRC connection of the CSG member.

First Modification of Fourth Embodiment

As another specific method of redirecting a UE being a non-CSG member that has been in RRC_Connected state to another cell, at a hybrid cell in a congested state, a new RRC connection request is made from the UE being a CSG member and, in a case where the hybrid cell receives the RRC connection completion, the procedure of redirecting the UE being a non-CSG member to another cell is triggered by the completion of RRC connection.

Figure 17:
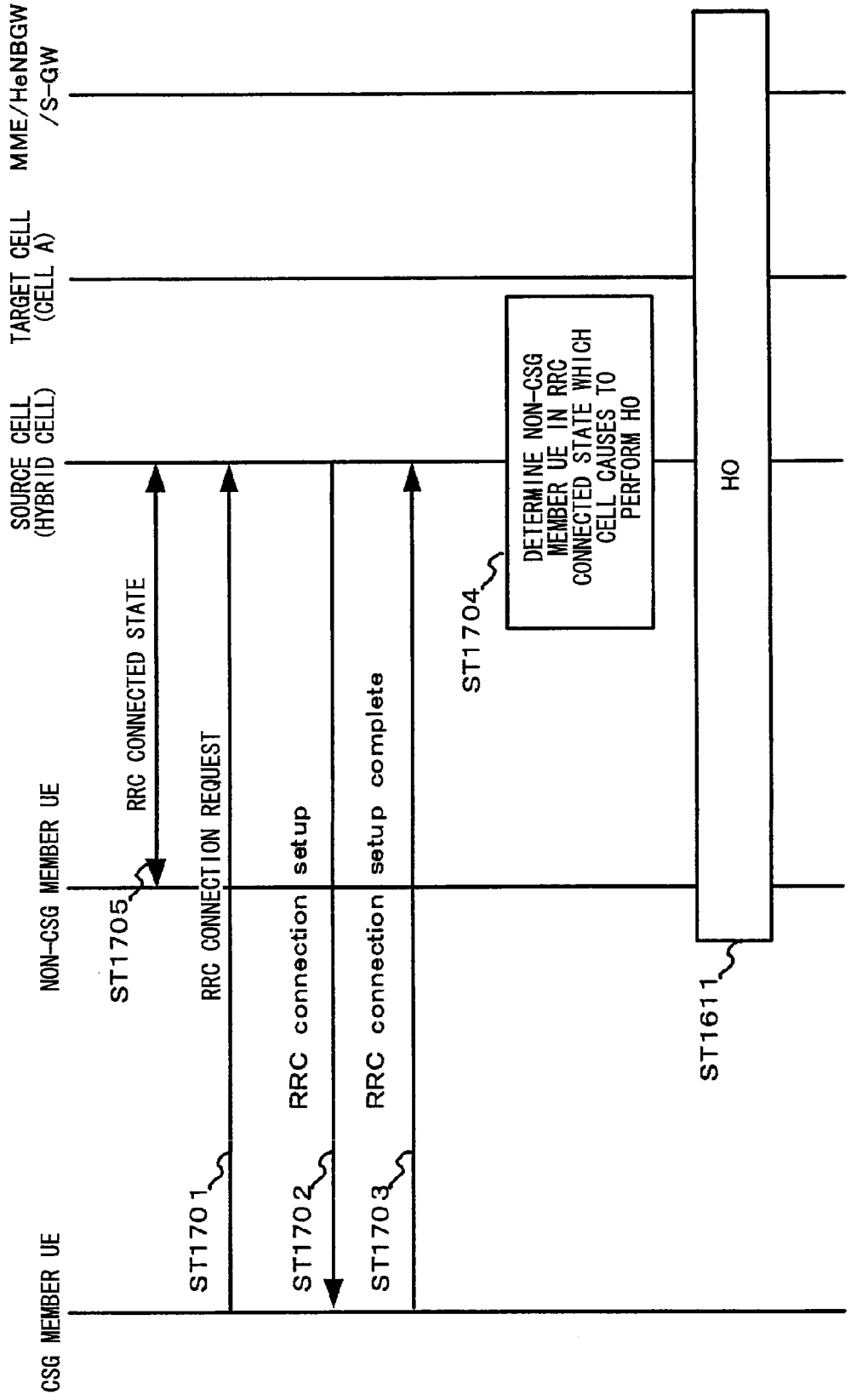
FIG. 17 shows an operation example in a case where redirection is triggered by checking of RRC connection.

As an example, FIG. 17 shows the method of activating the redirection of a UE being a non-CSG member to another cell in response to the RRC connection setup complete message, as RRC connection completion. HO is used as a specific method of redirection. In the figure, Step ST1611 is identical to a series of processing of Step ST1611 shown in FIG. 16.

The case where the non-CSG member is in the RRC connected state at a hybrid cell is described (Step ST1705). The UE being a non-CSG member may be provided services such as data communication with the core network side (such as MME) through the hybrid cell. In Step ST1701, the UE being a CSG member being served by the hybrid cell transmits an RRC connection request. In Step ST1702, the hybrid cell notifies the UE being a CSG member that has requested RRC connection of the RRC connection setup message. The UE being a CSG member that has received the setup message performs setup, and in Step ST1703, notifies the hybrid cell of the RRC connection setup complete message. In Step ST1704, the hybrid cell in a congested state that has received the RRC connection setup complete message determines a UE being a non-CSG member in the RRC connected state which the cell redirects at the own cell. Here, HO to another cell is redirection. HO is triggered by reception of a new RRC connection setup complete message from the UE being a CSG member at a hybrid cell in a congested state. In other words, after the completion of connection between the UE in a closed mode and a hybrid cell (base station), the UE in an open mode is redirected to another cell (base station) from the hybrid cell (base station).

Accordingly, the UE being a CSG member enters the RRC connected state, and thus is prepared to perform data communication with the core network at any time. Therefore, in a case where, for example, another UE being a non-CSG member in an RRC connected state that is being served by the hybrid cell ends communication or changes to the RRC_Idle state, even when the UE being a non-CSG member to perform redirection (HO) has not completed HO, the CSG member can communicate with the core network through a hybrid cell, and accordingly is capable of receiving the service as a CSG member.

HO is used as the specific method of redirection in the specific example described above. It may be, not limited to HO, release of RRC connection from a hybrid cell, or camping on another cell after the release of RRC connection from a hybrid cell. As a method of camping on another cell, cell selection or cell reselection may be performed. On this occasion, selection to the hybrid cell whose RRC connection has been released is prohibited. A timer may be provided with the constant time period for prohibition. This prevents the situation in which cell selection or cell reselection cannot be performed to the hybrid cell permanently. This method does not allow a UE being a non-CSG member to continue the RRC connected state but allows the UE to establish RRC connection again at another cell.

Fifth Embodiment

Non-Patent Document 8 describes the method of, in a case where the hybrid cell is congested, changing (from FALSE to TRUE) a CSG-indicator being broadcast information of a cell when the UE being a non-CSG member is redirected to another cell. The CSG-indicator is included in the SIB1, and TRUE is set in a case of a CSG cell only in a closed access mode, whereas FALSE is set in a case of a non-CSG cell only in an open access mode or a hybrid cell in a hybrid mode. Therefore, as a result of changing (from FALSE to TRUE) the CSG-indicator of a hybrid cell, the hybrid cell is caused to operate as a CSG cell only in a closed access mode, which prevents the UE being a non-CSG member from accessing the hybrid cell.

However, in a case where HO is used as a specific method of redirecting a UE being a non-CSG member that has been in the RRC-Connected state to another cell, a problem arises when this method is performed. Normally, the HO procedure returns to the setting of a source cell in a case where HO to the target cell fails (HO failure, HOF). This is also referred to as reverting back.

Figure 18:
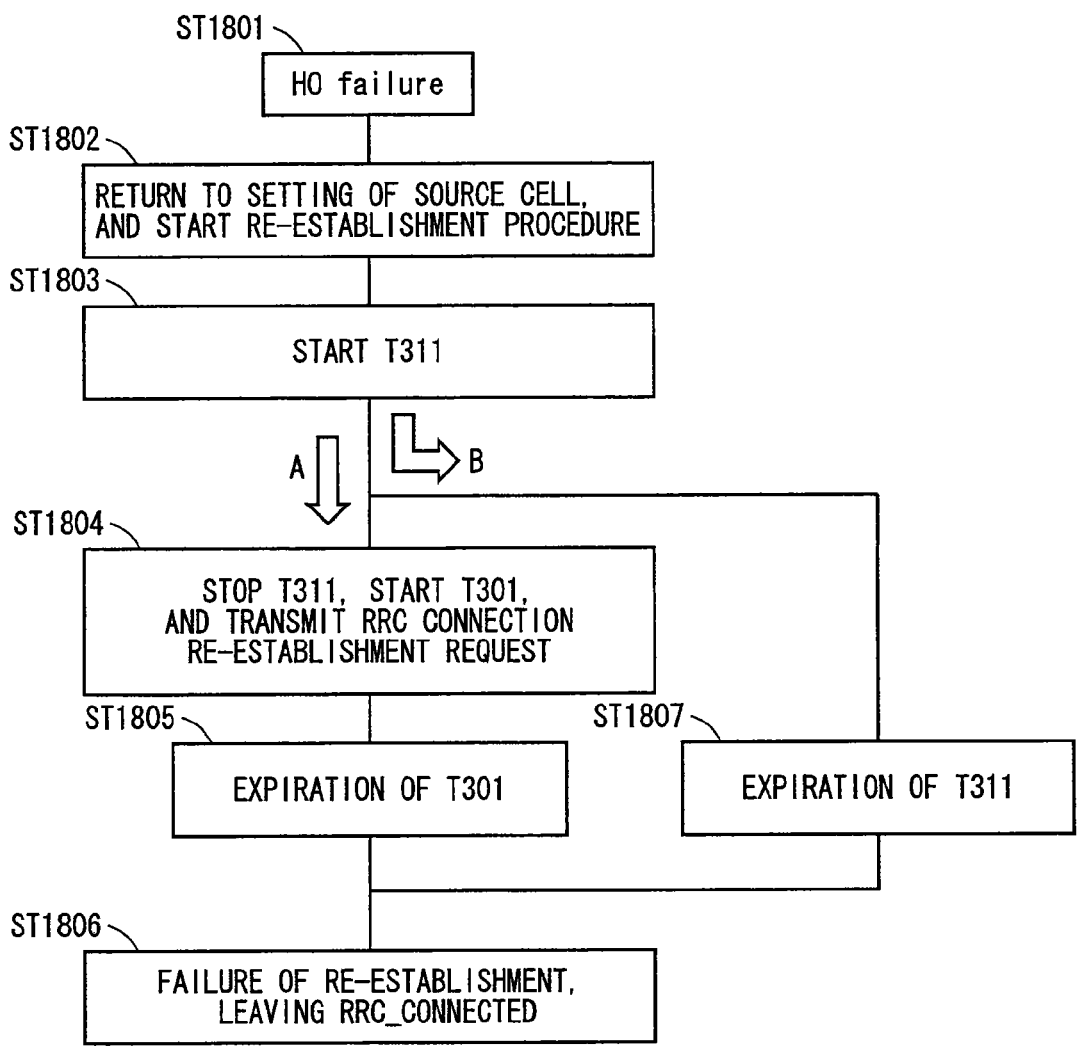
FIG. 18 is a chart illustrating an operation of a UE in a case of an HO failure, which is currently under discussion of 3GPP.

FIG. 18 shows the operation of the UE in an HO failure in 3GPP standards (Non-Patent Document 9). When the UE detects an HO failure in Step ST1801, in Step ST1802, the UE returns to the setting of a source cell and starts a re-establishment procedure of RRC connection. In the re-establishment procedure of RRC connection, the UE starts T311 (Step ST1803). T311 is a timer of the time period that is allowed for the re-establishment procedure of RRC connection. The UE returns to the setting of a source cell in Step ST1802, and thus selects a source cell as a suitable cell. In the case of selecting a suitable cell, the UE immediately moves to Step ST1804 (A). In Step ST1804, the UE stops the timer 311 and starts T301, to thereby transmit an RRC connection re-establishment request to the source cell. T301 is a timer of the time period allowed for the UE to receive an RRC connection re-establishment message from the source cell. After that, in a case where the UE fails to receive the RRC connection re-establishment message and T301 expires (Step ST1805), the UE moves to Step ST1806 and judges that the RRC connection re-establishment has failed, and then leaves from the RRC connected state.

As shown in FIG. 18, also in the 3GPP standards, a UE returns to the setting of a source cell when it fails in HO to a target cell. Normally, the source cell is a cell that has been accessed, and accordingly, is a suitable cell. That is, the UE reverts back to the source cell in a case of a normal HO failure, and always performs the procedure in the case of selecting a suitable cell (A).

However, a problem arises in a case where a CSG-indicator of the SIB1 of a hybrid cell in a congested state is changed (from FALSE to TRUE), and accordingly the hybrid cell is caused to operate as a CSG cell only in a closed access mode and the UE being a non-CSG member that has been in the RRC connected state is caused to perform HO to another cell. This is because the source cell (concerned hybrid cell) in the HO procedure is no longer a suitable cell for the UE being a non-CSG member. This is because the CSG-indicator is TRUE at the hybrid cell (concerned source cell) in a congested state. In a case where the CSG-indicator is TRUE, only the UE being the same CSG member can be treated as a suitable cell. Therefore, the UE being a non-CSG member is no longer a suitable cell.

In such a case, the hybrid cell (concerned source cell) is no longer a suitable cell even when the UE being a non-CSG member returns to the setting of the source cell due to an HO failure, and thus the UE can do nothing but to wait the expiration of the timer of T311 (B). In Step ST1807, the UE moves to Step ST1806 upon expiration of the T311 timer and fails to re-establish RRC connection, which has to leave from the RRC connected state. As described above, the case of performing a normal HO procedure for redirecting a UE being a non-CSG member causes a problem that RRC connection cannot always be re-established in an HO failure. Further, the UE always has to wait the time period when T311 expires before leaving the RRC connected state in an HO failure, and wastefully spends a time period until leaving the RRC connected state for enabling the next operation.

Those problems are not described in any prior art document and is not discussed by 3GPP.

In order to solve the above-mentioned problems, in the present embodiment, the CSG-indicator of the SIB1 of a hybrid cell in a congested state is changed (from FALSE to TRUE) after successful redirection of a UE being a non-CSG member.

As described above, a setting change so as to disable reverting back to the hybrid cell (base station) is executed after the successful handover, which enables the UE being a non-CSG member caused to perform HO by the hybrid cell in a congested state to revert back to the source cell even in the case of an HO failure to a target cell. Therefore, with reference to FIG. 18, the UE being a non-CSG member is capable of executing Step ST1804 by a route A. This allows the UE to re-establish RRC connection.

Further, the hybrid cell can also execute HO again to the UE being a non-CSG member that has reverted back. The UE being a non-CSG member is capable of reverting back until it succeeds in HO, and thus will not leave from the RRC connected state.

As to whether or not the UE being a non-CSG member has successfully performed redirection may be judged from as to whether or not HO has completed at a hybrid cell in a case where a specific method of redirection is HO. It suffices that redirection is considered to have succeeded in the case where HO has completed and redirection is considered to have failed in the case where HO has not completed. Whether or not HO has completed may be judged from whether or not resources have been released in Step ST1514 of FIG. 15.

In a case where a specific method of redirection is release of RRC connection from a hybrid cell or camping on another cell after the release of RRC connection from the hybrid cell, the UE leaves from the RRC connected state in each case, which particularly causes no problem. Therefore, it suffices that the CSG-indicator of the SIB1 is changed (from FALSE to TRUE) when the hybrid cell starts the operation.

This enables to, when a hybrid cell is congested, solve a problem that RRC connection cannot be always re-established in a case of an HO failure of a UE being a non-CSG member when the UE being a non-CSG member is redirected to another cell. Accordingly, there can be achieved effects that the CSG member can receive benefits preferentially such as high-speed service and account setting at a hybrid cell, and that the UE being a non-CSG member can also continue communication by performing HO to another cell while keeping the RRC connected state.

First Modification of Fifth Embodiment

However, in a case where the setting for prohibiting reverting back to a hybrid cell is changed after the success of HO, a UE being a CSG member can never access the hybrid cell unless HO succeeds. In order to prevent this, it suffices that an HO failure is regarded after a lapse of a predetermined time period, so that a UE leaves from the RRC connected state with the hybrid cell. The predetermined time period may be clocked with a timer. It may be a timer for the first reception of HO control information by a UE through redirection from a source cell to the success of HO.

A predetermined time period is set by a source cell and is notified to a UE. Three methods of notifying the predetermined time period are disclosed as follows.

In the first method, a cell (on a network side) makes a notification to a UE with the use of the BCCH as the broadcast information on the PBCH or PDSCH. The cell makes a notification on the PBCH using the master information (MIB) or on the PDSCH using the system information (SIB). This is an excellent method in that all UEs being served thereby can be notified and that radio resources are effectively used.

In the second method, a cell determines the UE which the cell causes to perform HO and then makes a notification to the UE on a dedicated control channel (DCCH). It may be included in the measurement control message notified to the UE by the cell or the mobility (HO) control information notified to the UE by the cell. It suffices that the notification is made before the first HO execution step in HO of redirection. This enables to set an allowed time period for each UE, whereby setting can be made flexibly in accordance with the situation of radio waves or capability of the UE to be caused to perform HO or whether or not a UE is a CSG member.

In the third method, a static value is set as a mobile communication system. The static value as a mobile communication system represents a value known to a UE and a base station as a mobile communication system, or a value described in, for example, specifications. As a result, a radio signal does not occur between a base station (on a network side) and a UE. Accordingly, there can be achieved an effect that radio resources are effectively used. Further, the value is determined in a static manner, whereby it is possible to achieve an effect that erroneous reception of a radio signal is prevented.

The method disclosed in an eleventh embodiment is applicable as a specific example of the timer. One example thereof is the method of causing the time period until HO success to be integral multiple of a timer for conventional HO (T304, see Non-Patent Document 9) and notifying the UE of the integer value by the source cell. This allows the source cell to flexibly set the time period until HO success in consideration of the time period until one HO failure of the UE being a non-CSG member and the allowed access time delay of the UE being a CSG member to the hybrid cell. As this timer, it is possible to use a new timer disclosed in the eleventh embodiment.

This prevents the situation in which a UE being a non-CSG member can never succeed in HO and thus a UE being a CSG member can never access a hybrid cell in a congested state.

Sixth Embodiment

In a case where a hybrid cell is congested, when the CSG-indicator that is the broadcast information of the cell is changed (from FALSE to TRUE) to redirect a UE being a non-CSG member to another cell, a time period is spent wastefully before the UE being a non-CSG member leaves from the RRC connected state to be ready to perform the next operation in a case of an HO failure. In order to solve this problem, returning back to the setting of a source cell is prohibited in a case of an HO failure in the present embodiment. In other words, reverting back to a source cell when HO fails is prevented.

Specifically, at least while the CSG-indicator that is the broadcast information of a hybrid cell operates as TRUE, returning back to the setting of a source cell is prohibited even when HO fails in a case where a hybrid cell redirects (HO) the UE being a non-CSG member to another cell. This prevents the UE being a non-CSG member that has failed in HO from returning to the setting of a source cell and performing the procedure for RRC connection re-establishment. As a result, an unnecessary procedure is eliminated, leading to an effect that the control in an HO failure can be simplified.

Further, it suffices that in a case where the UE being a non-CSG member that has been redirected (HO) to another cell fails in HO to a target cell, a procedure of leaving the RRC connection is started immediately.

Figure 19:
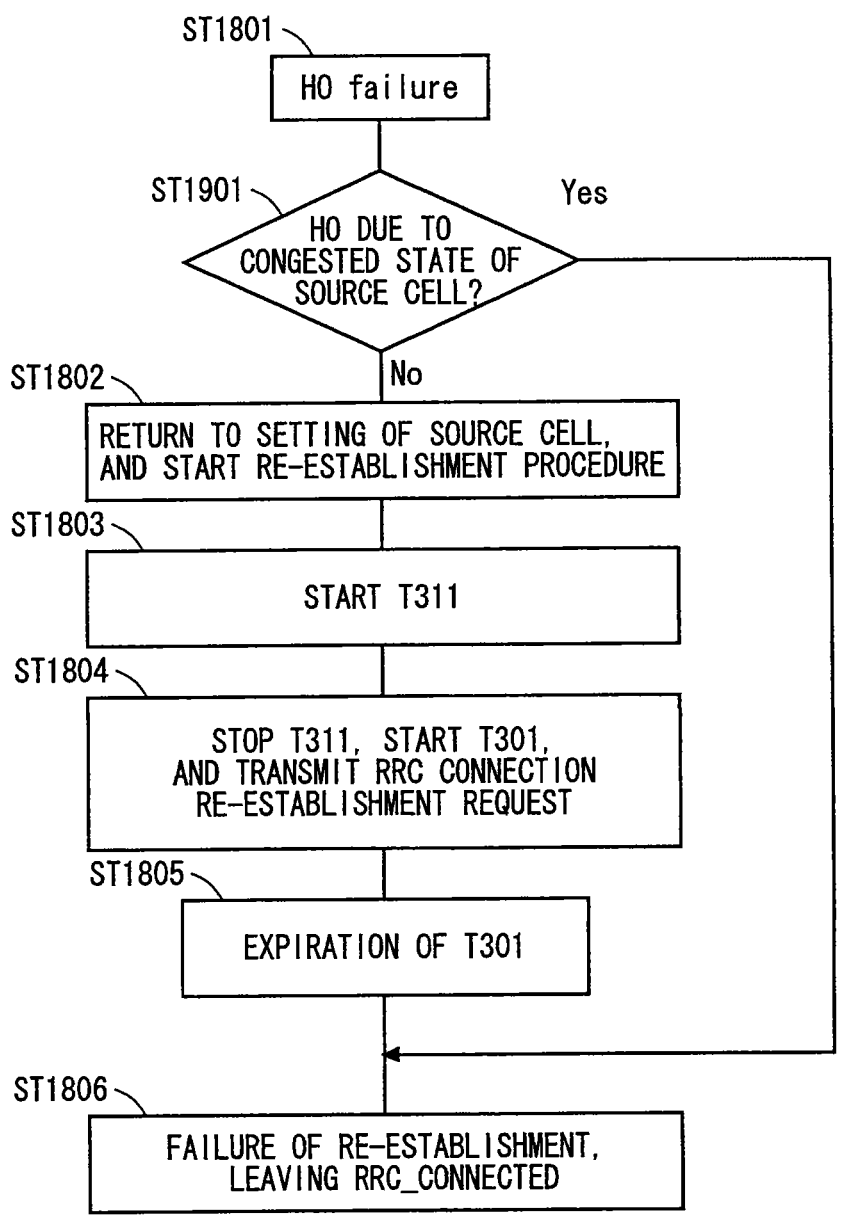
FIG. 19 shows a specific example of the operation of a UE in a case of an HO failure according to the present invention.

FIG. 19 shows a specific example of the operation of a UE in a case of an HO failure, which is disclosed in the present embodiment. The description of the same step numbers as those of FIG. 18 in FIG. 19 is omitted. In Step ST1801, a UE detects an HO failure. In Step ST1901, the UE judges whether or not HO is one in a congested state. In a case where HO is not one in a congested state, the UE moves to Step ST1802 and executes the normal procedure in an HO failure. In a case of HO in a congested state, the UE prohibits returning back to the setting of a source cell and immediately moves to Step ST1806. The UE being a non-CSG member that has been redirected (HO) from a hybrid cell in a congested state corresponds to Yes in Step ST1901, which fails in RRC connection re-establishment in Step ST1806 and immediately leaves from the RRC connection.

As a result, even if the UE being a non-CSG member fails in HO, it can leave from RRC connection and perform the procedure of cell selection without waiting the time period (T311) allowed for the normal procedure of RRC connection re-establishment. Therefore, the UE being a non-CSG member can search for a cell on which it can camp in a short time period without a delay.

Note that in a case of starting the procedure for leaving RRC connection, not the procedure for cell selection but the procedure for cell reselection may be performed. Further, the UE being a non-CSG member is allowed to search for a cell on which it can camp in a short time period without a delay.

When leaving RRC connection and then performing cell selection or cell reselection in the procedure for cell selection or cell reselection, the UE being a non-CSG member does not select a source cell. This is because it is an HO failure while the broadcast information CSG-indicator of the hybrid cell being a source cell operates as TRUE. The source cell is no longer a suitable cell, and accordingly camp-on cannot be performed thereon. Therefore, the UE being a non-CSG member can immediately access another cell without selecting a hybrid cell in a congested state that has been a source cell.

Seventh Embodiment

The present embodiment discloses another method for solving a problem that in a case where a hybrid cell is congested, the UE being a non-CSG member always cannot re-establish RRC connection in an HO failure when the CSG-indicator that is the broadcast information of a cell is changed (from FALSE to TRUE) and a UE being a non-CSG member is redirected to another cell.

At least while the CSG-indicator that is the broadcast information of a hybrid cell operates as TRUE, a plurality of target cells are set in HO from the hybrid cell. In a case where a plurality of cells are treated as target cells and the UE being a non-CSG member fails in HO to the first target cell, the UE attempts to perform HO to another target cell. This solves a problem that RRC connection cannot always be re-established in an HO failure.

Figure 20:
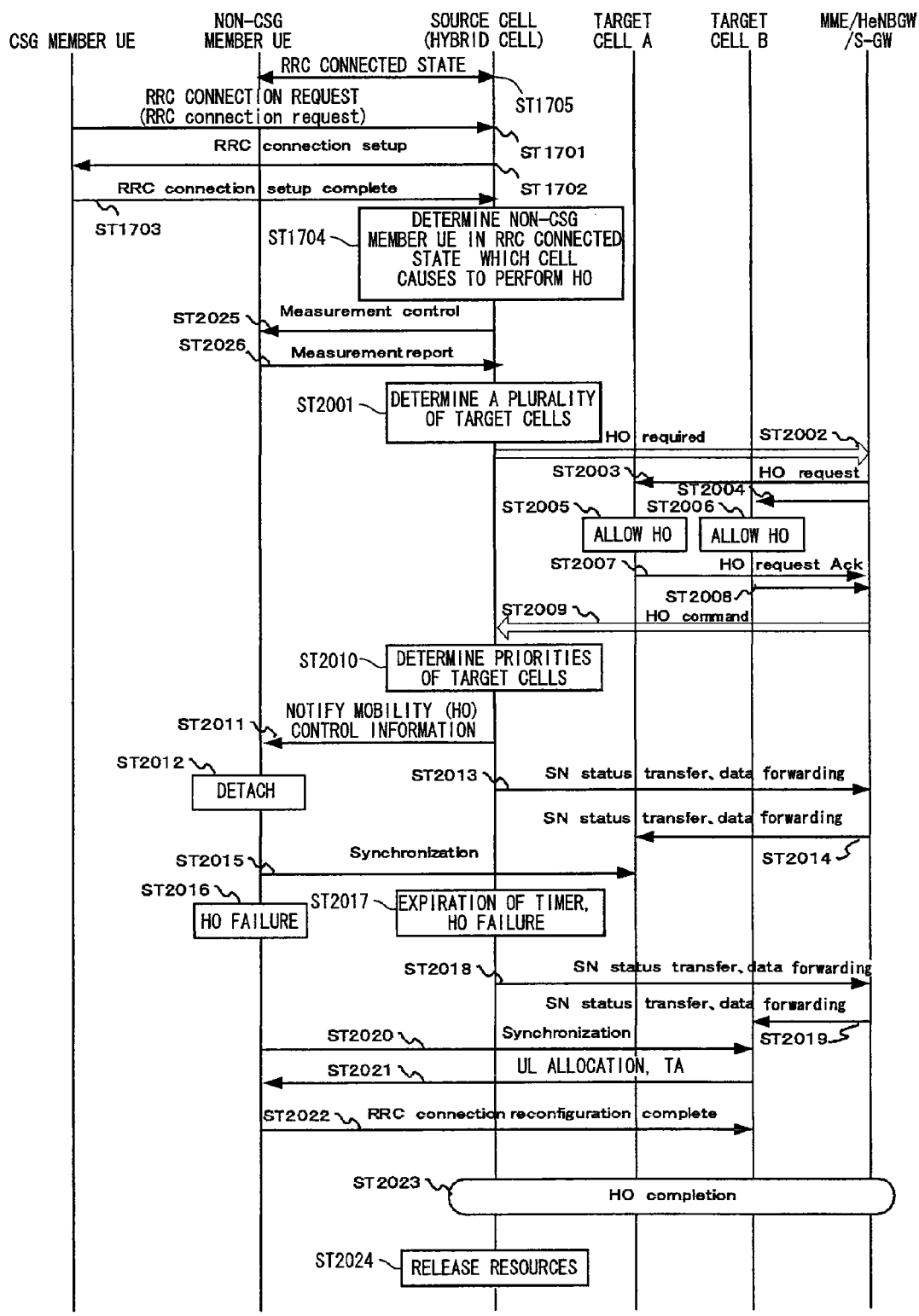
FIG. 20 shows a sequence example in a case where a plurality of cells are treated as target cells when a hybrid cell is congested.

A specific operation is described. FIG. 20 shows a sequence example in which a plurality of cells are treated as target cells when a hybrid cell is in a congested state. The description of the same step numbers as those of FIG. 17 in FIG. 20 is omitted. In this example, the source cell is a hybrid cell. In Step ST1704, the source cell determines a UE being a non-CSG member in the RRC connected state which the cell redirects (HO). In Step ST2025, the source cell notifies the UE being a non-CSG member which the cell causes to perform HO of a measurement control message, and in Step ST2026, the UE notifies the source cell of a measurement report. In Step ST2001, the source cell determines a plurality of target cells based on the measurement report. As disclosed in the fourth embodiment, Step ST2025 and Step ST2026 may be omitted.

In Step ST2002, Step ST2003 and Step ST2004, the source cell that has determined a plurality of target cells in Step ST2001 notifies each target cell of an HO request message for the plurality of target cells through the MME (or HeNBGW). On this occasion, the HO request message notified to the MME from the source cell may be made such that one message contains the information of a plurality of target cells as shown in Step ST2002 or a message is individually set for each target cell. In this example, a target cell A and a target cell B correspond to a plurality of target cells. In Step ST2005 and Step ST2006, each target cell determines whether or not to allow HO based on the load condition of the own cell, the information regarding the UE included in the HO request message, and the like. This example describes the case where HO is allowed. If HO is not allowed, Ack is not returned to the source cell in response to an HO request or returns Nack indicating prohibition. In Step ST2007, Step ST2008 and Step ST2009, the target cell that has allowed HO notifies, through the MME, the source cell of the HO request allowance message indicating that HO is allowed. On this occasion, the HO request allowance message notified to the source cell from the MME may be made such that one message contains the information of a plurality of target cells as shown in Step ST2009 or a message is individually set for each target cell. This enables for the source cell to obtain the information of the plurality of target cells to which HO has been allowed.

In Step ST2010, the source cell determines the priorities for causing the UE to perform HO among the plurality of target cells to which HO has been allowed. In Step ST2011, the source cell notifies the UE of the HO control information. Not only the information regarding one target cell, but also the information regarding a plurality of target cells is included in the HO control information. Further, the information regarding the priorities of the plurality of target cells is included. The priorities may be included as numerical information. For example, 1, 2, 3 . . . may be affixed to each piece of target cell information in an order from the highest one. Alternatively, the target cell with the highest priority, the second may be notified as, for example, a primary target cell and a secondary target cell, respectively. As another method, Step ST2011 may be notified to UE a plurality of times. The information regarding one target cell may be included in one piece of HO control information such that the UE is notified for the number of times, which is the number of the plurality of target cells. The UE firstly performs HO to the target cell with the highest priority and, when HO fails, performs HO to the target cell with the next highest priority.

In an HO preparation step (from Step ST2002 to Step ST2011), an HO request message may be notified to one target cell as in a normal HO procedure and, in a case of an HO failure, the HO preparation step and the following steps may be repeated, without notifying a plurality of target cells of an HO request message.

However, in the normal HO procedure, the UE that has received the HO control information from a source cell is detached from the source cell. Accordingly, in a case where the HO preparation step is performed on a new target cell in an HO failure, the source cell has to notify the UE of the HO control information of the new target cell again. The UE is detached on this occasion, and thus the source cell cannot notify the UE of the HO control information of the new target cell.

The above-mentioned problem can be solved by performing the HO preparation step on a plurality of target cells, notifying the UE of the HO control information of the plurality of target cells before the UE is detached, and repeating the HO execution step and the following step in an HO failure.

In Step ST2013 and Step ST2014, the source cell that has determined the priorities for causing the UE to perform HO among the plurality of cells in Step ST2010 notifies the target cell (in this case, target cell A) with the highest priority of the data required for continuing communication in HO and the SN status information of the PDCP relating thereto. The data may be notified through the S-GW, not through the MME.

Meanwhile, the UE notified of the HO control information in Step ST2011 is detached from the source cell in Step ST2012, and in Step ST2015, starts synchronization with the target cell (target cell A) with the highest priority. This example describes the case of an HO failure. HO fails when, for example, synchronization has failed in Step ST2015 or the target cell cannot receive an RRC connection reconfiguration complete message (Step ST2016).

In the case of an HO failure, the source cell has to notify the target cell (in this case, target cell B) with the next highest priority of the information required for continuing communication in HO. Accordingly, the source cell has to recognize that the UE failed in HO to the target cell A. Therefore, setting is made such that an HO failure is judged if an UE context release message is not send from the target cell A or MME during a certain time period. The transmission/reception of a UE context release message is a part of the processing for completing HO. There may be provided a timer for clocking a certain time period. The timer may be stopped upon reception of the UE context release message. The source cell judges an HO failure in a case where the timer expires (Step ST2017) and, in Step ST2018 and Step ST2019, notifies the target cell of the data required for causing the target cell B with the next highest priority to continue communication in HO and the SN status information of the PDCP related thereto. The data may be notified through the S-GW, not through the MME. A timer for normal HO (T304, see Non-Patent Document 9) may be used as this timer. Alternatively, the certain time period may be derived based on the set value of the timer for normal HO. For example, the certain time period may be made shorter than the value of the timer for normal HO by a certain time period. Then, the source cell may notify the target cell with the next highest priority of the information required for HO, before the UE judges an HO failure by the normal timer and starts synchronization with the target cell with the next highest priority.

Meanwhile, in Step ST2020, the UE that has judged a failure in HO to the target cell A in Step ST2016 starts synchronization with the target cell (in this case, target cell B) with the next highest priority in accordance with the information regarding a plurality of target cells contained in the HO control information received from the source cell in Step ST2011. It suffices that in a case where the HO control information received from the source cell in Step ST2011 contains a plurality of target cells, the UE is allowed to perform HO again in an HO failure or perform synchronization (Step ST2015) therefor. Alternatively, the UE may perform HO again to the cell within the range of the received plurality of target cells in an HO failure. In a case of receiving the priorities in Step ST2011, the UE may perform HO in accordance with the priorities.

After the UE establishes synchronization with the target cell B, in Step ST2021, the target cell B notifies the UE of allocation information of uplink resources and timing advance (TA) information that is transmission timing information. In Step ST2022, the UE that has received the information notifies the target cell B of an RRC connection reconfiguration complete message. Accordingly, data communication is started between the UE and the target cell B. In Step ST2023, the target cell B that has received Step ST2022 performs the processing for completion of HO with the source cell through the MME or S-GW that is an entity of higher layer. Along with the processing for completion of HO in Step ST2023, in Step ST2024, the source cell releases the resources used in control associated with the information regarding the UE.

As described above, the HO preparation step is performed on a plurality of target cells, and the HO execution step and the following step are repeatedly performed in a case of an HO failure. Accordingly, in an HO failure, the UE cannot always re-establish RRC connection, but can attempt to perform HO to another target cell. Therefore, in a case where the hybrid cell is in a congested state, when the UE being a non-CSG member is redirected to another cell, it is possible to solve the problem that RRC connection cannot always be re-established in a case of an HO failure of the UE being a non-CSG member. This achieves an effect that the CSG member is allowed to preferentially receive the benefits such as high-speed service and the account setting at a hybrid cell and the UE being a non-CSG member also becomes able to perform HO to another cell and continue communication while continuing an RRC connected state.

If HO fails to all of a plurality of target cells, the method disclosed in the sixth embodiment may be applied. It suffices that in the case where HO fails in the congested state of the source cell, the UE does not return to the setting of a source cell but immediately leaves from the RRC connected state. This enables, even when a UE being a non-CSG member fails in HO to all target cells, the UE to search for a cell on which it can camp in a short time period without a delay.

At least while the CSG-indicator that is the broadcast information of a hybrid cell operates as TRUE, a maximum value may be provided to the number of target cells in allowing that the target cells in HO from the hybrid cell are treated as a plurality of cells. A maximum value may be provided in determination of a plurality of target cells in Step ST2001, or a maximum value may be provided in determination of the priorities of the target cells in Step ST2010. Alternatively, a maximum value of the target cell that performs the concerned HO may be provided such that the UE performs HO to the target cell within the maximum value. A maximum value may be determined in advance or, in the case where it is used by the UE, may be notified to the UE from a source cell or from the core network side (MME, HeNBGW) through the source cell. As the notification method, it may be notified to the UEs being served by the source cell in a broadcast manner using the broadcast information or may be dedicatedly notified to the UE. In a case where the UE is notified dedicatedly, a maximum value may be contained in the HO control information to be notified.

Setting of a maximum value enables to limit an amount of the information required to be notified to the target cell or UE by the source cell or a signaling amount of a message. In addition, it is possible to avoid a control delay caused by complicated operation as a system or congestion of signaling between a large number of cells and MMEs, HeNBGWs or S-GWs.

Eighth Embodiment

The seventh embodiment has disclosed, as an example, the method of simultaneously making an HO request to a plurality of target cells when the HO preparation step is performed on the plurality of target cells. The present embodiment discloses the method of making HO requests on a plurality of target cells in a serial manner.

Figure 21:
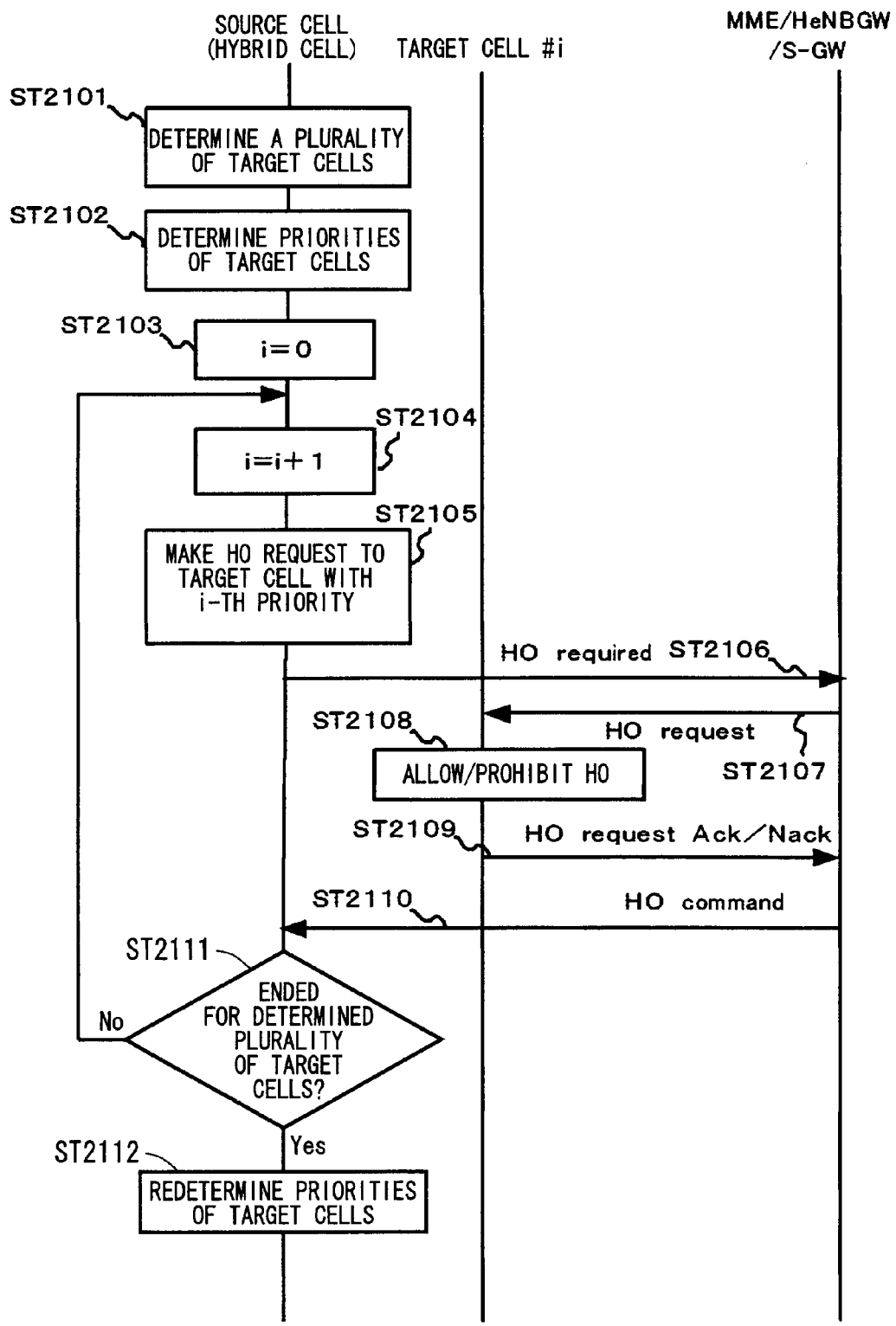
FIG. 21 shows a sequence example in a case where HO requests are serially made to a plurality of target cells.

FIG. 21 shows a sequence example in a case where HO requests are serially made on a plurality of target cells, which shows a new process from Step ST2001 to Step ST2010 that is a different operation from that of FIG. 20 showing a sequence of entire HO. The source cell is a hybrid cell. An i-th target cell is represented as a target cell #1.

In Step ST2101, a source cell determines a plurality of target cells. In Step ST2102, the source cell determines the priorities of the target cells determined in Step ST2102. In Step ST2103, i is replaced by 0, and in Step ST2104, i=i+1. In Step ST2105, the source cell makes an HO request to the target cell with the i-th priority. In Step ST2106 and Step ST2107, the source cell notifies the target cell #i of the HO request through the MME. The target cell #i judges as to whether or not allow HO to the UE (Step ST2108) and, in Step ST2109 and Step ST2110, notifies the source cell of an HO request allowance/prohibition message through the MME. The source cell that has received the HO request allowance/prohibition message judges whether or not the plurality of target cells determined in Step ST2101 have been all notified of the HO request. In the case where they have not been notified, the source cell returns to Step ST2104 and repeats the process up to Step ST2110 on the target cell with the next highest priority. In a case where the target cells are all notified of an HO request in Step ST2111, the source cell moves to Step ST2112 and again determines the priorities of the target cells that have received the HO request allowance message.

It has been described here that the HO preparation step from Step ST2105 to Step ST2110 is sequentially performed, and the HO execution step and HO completion step thereafter are performed sequentially as well.

Accordingly, it suffices that the source cell signals an HO request message as required. This reduces an amount of signaling performed simultaneously, and thus the congestion of signaling by means of an interface among the cell and MME and HeNBGW, whereby it is possible to reduce signaling transmission/reception errors. The erroneous reception of an HO request allowance/prohibition message can be reduced at the source cell.

First Modification of Eighth Embodiment

In a case where HO requests are serially made for a plurality of target cells, a desired number of target cells may be set.

Figure 22:
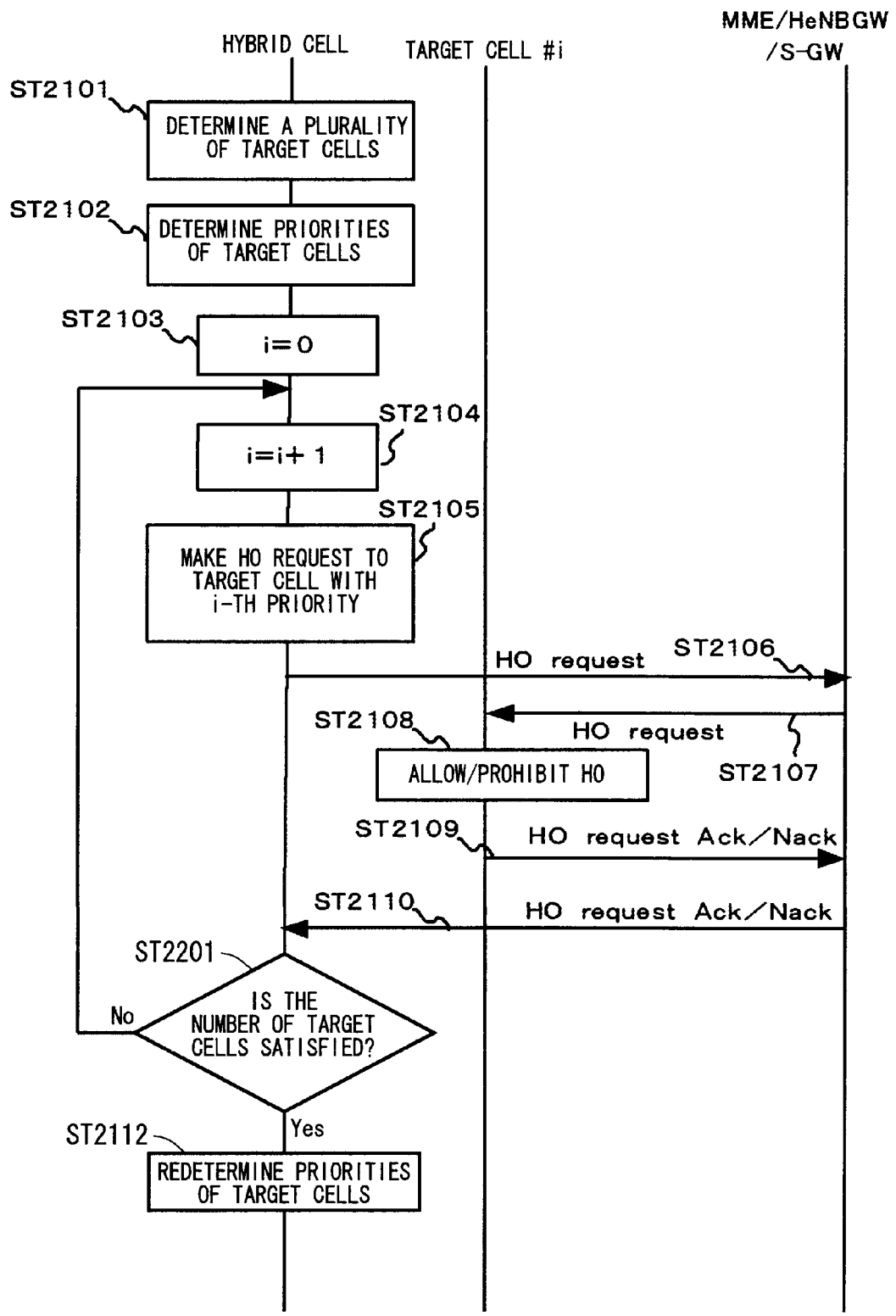
FIG. 22 shows a sequence example in a case where a desired number of target cells is set.

FIG. 22 shows a sequence example in a case where a desired number of target cells is set. The description of the same numbers as those of FIG. 21 in FIG. 22 is omitted. In Step ST2201, the source cell counts the number of the target cells that have received an HO request allowance message and judges whether or not the desired number of target cells is satisfied. In a case where it is not satisfied, the source cell returns to Step ST2104 and repeats the HO request again to the target cell with the second next highest priority. In a case where the desired number of target cells is satisfied in Step ST2201, the source cell moves to Step ST2112.

Accordingly, it suffices that the source cell signals an HO request message only to the minimum required number of target cells. This eliminates wasteful signaling, which makes it possible to stabilize the operation as a system.

As another method, in a case where HO requests are serially made to a plurality of target cells, the target cells that have received the HO request allowance message in a certain time interval may be treated as target cells. There may be provided a timer that clocks a certain time interval. The target cells that have received the HO request allowance message in the time interval are treated as target cells, so that the source cell determines the priorities of the target cells notified to the UE in Step ST2112 again.

As a specific example, with reference to FIG. 22, i is set to 0 in Step ST2103 and a timer that clocks the time interval is started, so that the processing in Step ST2201 is judged based on whether or not the timer has expired. It suffices that the source cell returns to Step ST2104 in a case where the timer has not expired and moves to Step ST2112 in a case where the timer has expired.

This enables to limit the time period required for the HO preparation step, whereby it is possible to limit the time period of disconnection of a conversation of a UE being a non-CSG member that is redirected (HO) from the hybrid cell in a congested state to another cell. In addition, it is possible to reduce the time delay until the UE being a CSG member that newly performs RRC connection with the hybrid cell becomes able to communicate.

Note that those methods may be used in combination. Alternatively, the method disclosed in the first modification of the eighth embodiment is applicable also to a case of making HO requests to a plurality of target cells non-serially, which has been described in the seventh embodiment.

Ninth Embodiment

In the seventh and eighth embodiments, at least while the CSG-indicator that is the broadcast information of a hybrid cell operates as TRUE, target cells in HO from the hybrid cell are allowed to be a plurality of cells. The method of performing the HO preparation step on a plurality of target cells and repeating the HO execution step and the following step in a case of an HO failure is disclosed as a specific operation example.

As another specific example, the present embodiment discloses, of the HO preparation step and the HO execution step, the method of performing, on a plurality of target cells, the process up to the notification of the data required for continuing communication in HO by target cells and the SN status information of the PDCP related thereto, and repeating the following step.

Figure 23:
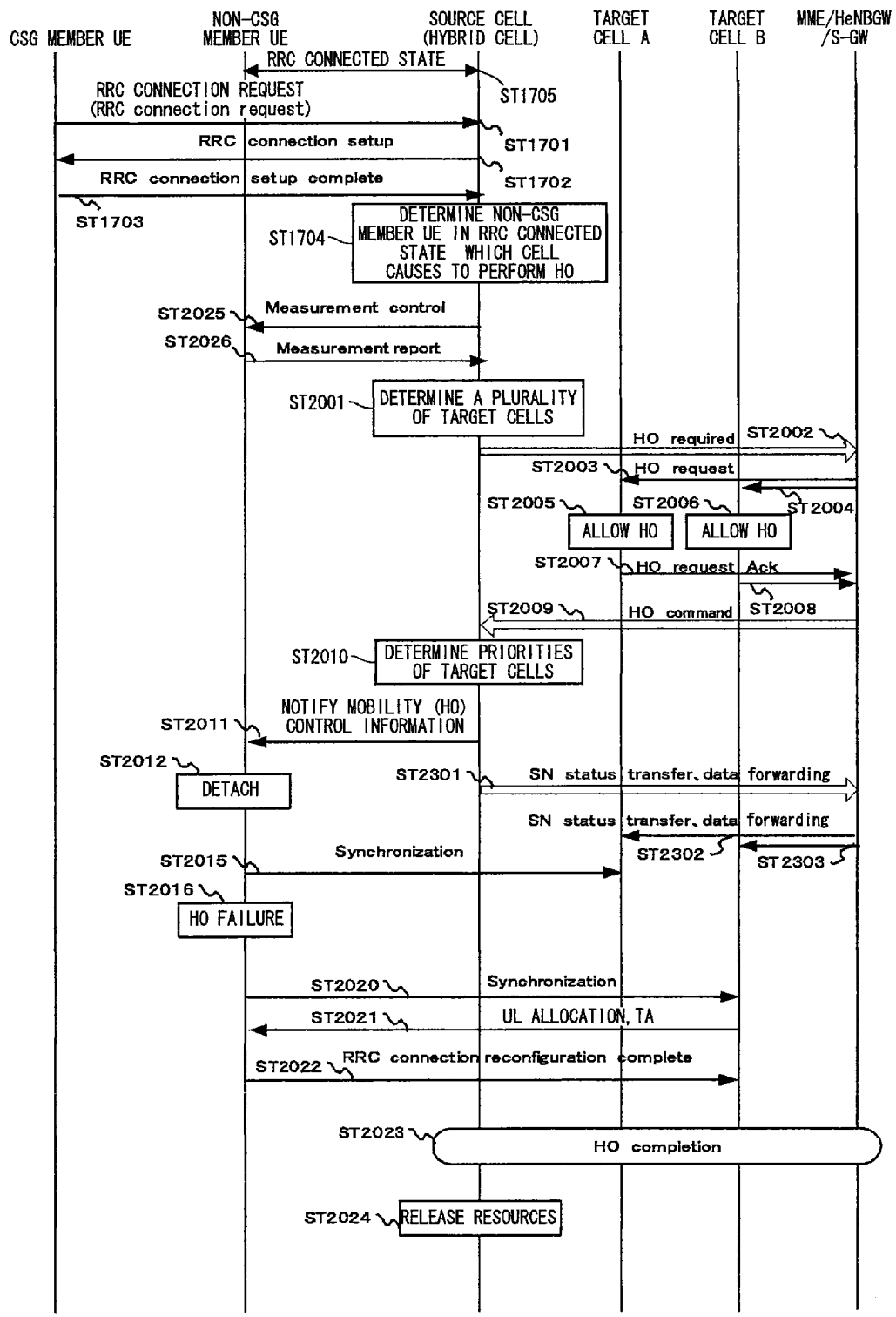
FIG. 23 shows a sequence example in a case where a plurality of target cells are notified of the data required for continuing communication up to SN status information of PDCP related thereto.

FIG. 23 shows a sequence example in which the process up to the notification of the data required for continuing communication and the SN status information of the PDCP related thereto is performed on a plurality of target cells. The source cell is a hybrid cell. The description of the same numbers as those of FIG. 20 in FIG. 23 is omitted. With reference to FIG. 23, the source cell determines the priorities of a plurality of target cells in Step ST2010 and the HO control information is notified to a UE being a non-CSG member in Step ST2011, which are identical to FIG. 20. In Step ST2301, Step ST2302 and Step ST2303, the source cell notifies a plurality of target cells of the data required for continuing communication in HO and the SN status information of the PDCP related thereto. The data may be notified through the S-GW, not through the MME. It suffices that the plurality of target cells are identical to a plurality of target cells contained in the HO control information notified to the UE in Step ST2011. In this example, they are a target cell A and a target cell B. The data required for continuing communication in HO, which is notified to the S-GW from the source cell, may be made such that the information of a plurality of target cells is included in one message as shown in Step ST2301 or a message is provided dedicatedly for each target cell. Further, the SN status information of the PDCP related to the data required for continuing communication in HO, which is notified from the source cell to the MME or HeNBGW, may be made such that the information of a plurality of target cells is included in one message as shown in Step ST2301 or a message is set dedicatedly for each target cell.

This enables to notify the all cells that are target cells not only of the context information related to the UE notified from the source cell in Step ST2002, Step ST2003 and Step ST2004 but also of the data required for continuing communication in HO and the SN status information of the PDCP related thereto. Accordingly, even if the UE being a non-CSG member fails in HO to a target cell with the highest priority and performs HO to the target cell with the next highest priority, the target cell possesses the information required for HO, which enables HO of the non-CSG member.

Alternatively, in this case, the UE may determine the priorities of target cells. Even if the UE selects the next target cell when HO fails, the cell to be a target candidate has already possessed the information required for HO, whereby it is possible for the UE to perform HO. As a result of the UE determining the priorities of target cells, the source cell notifies the information of a plurality of target cells in Step ST2011 but is not required to notify the information of the priorities. Therefore, an amount of information can be reduced. Further, the processing of Step ST2017 shown in FIG. 20 is not required. The source cell has already notified all of the target cells of the information required for HO, and accordingly in a case where a UE fails in HO, is not required to send the information required for HO to the cell with the next highest priority. As a result, the source cell does not need to recognize an HO failure between a UE and a target cell. Therefore, the processing in Step ST2017 is not required. This enables to simplify the HO processing at the source cell. Further, the UE determines the priorities of target cells, which achieves an effect that a target cell that is highly likely to be connected to the UE can be selected. Further, the source cell does not need to notify, in each HO failure, the target cell of the data required for continuing communication in HO and the SN status information of the PDCP related thereto, which achieves an effect that a time period until HO is completed can be reduced.

The method disclosed in the present embodiment does not always prohibit RRC connection re-establishment in an HO failure but enables to attempt HO to another target cell. This solves the problem that, in a case where a hybrid cell is congested, RRC connection re-establishment is always prohibited in an HO failure of the UE being a non-CSG member when the UE being a non-CSG member is redirected to another cell. Therefore, the CSG member can preferentially receive benefits such as high-speed service at a hybrid cell and the account setting. In addition, there can be achieved an effect that a UE being a non-CSG member can also perform HO to another cell and continue communication while continuing the RRC connected state.

The methods disclosed in the seventh embodiment to the ninth embodiment are applicable at least while the CSG-indicator that is the broadcast information of a hybrid cell operates as TRUE, which is not limited thereto. In addition, those methods may be applied to the HO procedure in a case where HO destinations are a plurality of target cells. This enables to reduce a possibility that HO may fail.

Tenth Embodiment

In the present embodiment, the source cell (hybrid cell in a congested state) notifies the UE to be a redirection target of the redirection from the hybrid cell in the congested state. This notification is desirably performed before the HO execution step.

As a specific example of the method, the source cell determines a UE being a non-CSG member in the RRC connected state which the cell causes to perform HO in Step ST1602, which is disclosed in FIG. 16, and then makes a notification to the UE using the dedicated control channel (DCCH). This notification is desirably performed before the HO execution step.

The notification may be included in the measurement control message notified to the UE by the source cell in Step ST1501. This enables a source cell or the UE to distinguish the measurement in HO by the redirection from a hybrid cell in a congested state from the measurement in normal HO, which allows the measurement method, for example, the criteria of a report or a threshold of an event to vary between two types of HO.

As another method, the notification may be included in the measurement HO control information in Step ST1507. Similarly, this enables a source cell or the UE to distinguish HO by the redirection from a hybrid cell in a congested state from normal HO. Further, it is applicable to a case where, for example, measurement control is omitted.

As a specific method of indicating the redirection from a hybrid cell in a congested state, 1 bit of information may be used. For example, it is conceivable that normal HO is applied in a case of "0" and HO by the redirection from a hybrid cell in a congested state is applied in a case of "1".

The source cell notifies the UE to be a redirection target of the redirection from a hybrid cell in a congested state, which enables to use the notification in the judgment performed by the UE as to whether or not HO is one in the state in which a source cell is congested, which is disclosed in the sixth embodiment (Step ST1901 of FIG. 19). When the UE fails in HO, it is possible to use the notification in the judgment as to whether to return to the setting of a source cell (reverting back is performed) or not to return to the setting of a source cell (reverting back is not performed). Alternatively, the notification may be used as the judgment index whether or not the UE redirected (HO) to the hybrid cell in a congested state performs HO again in an HO failure. For example, in a case where the maximum number of target cells differs between normal HO and HO by redirection, the number of target cells to which HO is tried again may be changed based on the information indicating the redirection from the hybrid cell in the congested state.

The method disclosed in the present embodiment enables a UE to be a redirection target to explicitly receive the indication that the redirection is one from a hybrid cell in a congested state, whereby malfunctions such as erroneous adoption of another HO method unlikely to occur. Accordingly, as a system, it is possible to stabilize an operation also in a case of using the method of redirecting to another cell at a hybrid cell.

Eleventh Embodiment

In the present embodiment, a timer for clocking, by a UE, the allowed time period for HO in which a plurality of target cells are set is newly provided separately from the timer for clocking the allowed time period for conventional HO in which a single target sell is set.

The timer for normal HO (T304, see Non-Patent Document 9) clocks the time period of a UE from receiving the HO control information from a source cell to succeeding in HO, that is, the time period until the UE transmits an RRC connection reconfiguration complete message to a target cell. In other words, this timer is a timer for HO to one target cell, which serves as a timer for judging whether or not HO to one target cell fails. In a case where HO is enabled to a plurality of target cells, this timer is used for HO to each target cell. That is, in a case where HO is enabled for a plurality of target cells, the allowed time period for a series of HO cannot be set. The allowed time period for a series of HO determines a time delay until a UE that is to receive a service at a source cell starts receiving the service or the communication interruption time of a UE performing HO. This means the importance in determining the operation of a system.

Therefore, in the present embodiment, the allowed time period (timer) for HO by a UE is newly provided separately from the allowed time period (timer) for conventional HO. As a specific example, there is provided the allowed time period (timer) of a UE from receiving the HO control information from a source cell to succeeding in a series of HO.

In a case where a UE fails in HO and repeatedly performs HO to a plurality of target cells, a series of HO is judged to have succeeded if the RRC connection reconfiguration complete message has been transmitted to any of target cells within the timer. However, in a case where the RRC connection reconfiguration complete message cannot be transmitted to any of target cells within the allowed time period, a series of HO is regarded as a failure, and the processing in an HO failure is performed. As the processing in an HO failure, it can be used in judgment as to whether or not HO is one performed by the UE in a state in which a source cell is congested, which is disclosed in the sixth embodiment (Step ST1901 of FIG. 19). This limits the allowed time period for a series of HO, whereby it is possible to limit the time delay until the UE that is to receive a service at a source cell starts receiving the service or the communication interruption time of a UE performing HO.

The allowed time period for a series of HO disclosed in the present embodiment and the conventional HO allowed time period may be used in combination. In a case where HO is enabled for a plurality of target cells, the conventional HO allowed time period may be used for HO to each target cell and the allowed time period for a series of HO may be used for a series of HO. The use of the timer for HO to each target cell allows the UE to recognize an HO failure to the target cell and then perform HO to a target cell with the next highest priority.

The allowed time period for conventional HO may be treated as the allowed time period for a series of HO, and the newly provided allowed time period for HO may be treated as the allowed time period for HO to each target cell. In any case, the above-mentioned effect can be achieved.

Three methods of notifying the allowed time period (timer) for a series of HO are disclosed below. In the first method, a cell (on a network side) makes a notification to a UE with the use of the BCCH as the broadcast information on the PBCH or PDSCH. The cell makes a notification on the PBCH using the master information (MIB) or on the PDSCH using the system information (SIB). This is an excellent method in that all UEs being served thereby can be notified and that radio resources are effectively used.

In the second method, a cell determines the UE which the cell causes to perform HO and then makes a notification to the UE on a dedicated control channel (DCCH). The notification is performed before the HO execution step. It may be included in the measurement control message notified to the UE by the cell or the mobility (HO) control information notified to the UE by the cell. This enables to set an allowed time period for each UE, whereby setting can be made flexibly in accordance with the situation of radio waves or capability of the UE to be caused to perform HO or whether or not a UE is a CSG member.

In the third method, a static value is set as a mobile communication system. The static value as a mobile communication system represents a value known to a UE and a base station as a mobile communication system, or a value described in, for example, specifications. As a result, a radio signal does not occur between a base station (on a network side) and a UE. Accordingly, there can be achieved an effect that radio resources are effectively used. Further, the value is determined in a static manner, whereby it is possible to achieve an effect that erroneous reception of a radio signal is prevented.

As another specific example of the method of newly providing the allowed time period (timer) for HO in a UE separately from the allowed time period (timer) for conventional HO, the allowed time period for a series of HO is caused to be integral multiple of the allowed time period for conventional HO. For example, when Ttotal represents the timer for a series of HO and Tsingle represents the timer for conventional HO, Ttotal=Tsingle×n (n is a positive integer). The method described above is applicable as the method of notifying a value of n. As a result, compared with the case of newly providing a detailed allowed time period, it is possible to reduce the amount of information because n is a positive integer. Alternatively, n may be a maximum value of a target cell. As to the maximum value of a target cell, the method disclosed in the seventh embodiment is applicable. In a case where the UE is notified of the maximum value of a target cell from the source cell, this value of n may not be notified. This further reduces an amount of information.

In the specific example disclosed in the present embodiment, newly provided HO allowed time period is used as the allowed time period for a series of HO, with the conventional HO allowed time period as the allowed time period for HO to each target cell. Not limited to the above, the newly provided allowed time period for HO may be treated as the allowed time period for HO to each target cell, with the allowed time period for conventional HO as the allowed time period for a series of HO. In any case, the above-mentioned effect can be achieved.

The present embodiment is generally applicable to the case where a plurality of cells are treated as target cells in HO, not limited to the case where a plurality of cells are treated as target cells in HO from a hybrid cell when the hybrid cell is congested.

In deleting CSG registration of a UE, HO led by a cell or network may be performed, and then, the methods disclosed in the fourth embodiment to the eleventh embodiment may be applied to the HO. In a case where the CSG registration of the UE is deleted, a cell belonging to the CSG is no longer a suitable cell. In a case where a UE is in an RRC connected state with the cell belonging to the same CSG to which the UE belongs, when HO led by a cell or network is performed in deletion of the CSG registration of the UE, it is possible to solve a problem occurring due to a fact that the source cell is no longer a suitable cell.

In expiration of the CSG registration period of a temporary member UE of the CSG, HO led by a cell or network may be performed, and the methods disclosed in the fourth embodiment to the eleventh embodiment may be applied to the HO. In a case where the CSG registration period of the temporary member UE expires, it is possible to solve a problem similar to the above, which occurs due to a fact that the cell belonging to the CSG is no longer a suitable cell.

In power-off of the HeNB, HO led by a cell or network may be performed, and the methods disclosed in the fourth embodiment to the eleventh embodiment may be performed on the HO. In the case where the power of the HeNB is turned off, access to the cell (HeNB) becomes impossible, whereby it is possible to solve a problem, which is caused as a result of the above, similar to the above-mentioned problem.

The present invention does not particularly describe a frequency carrier of a system, which may be intra-frequency cell reselection, cell selection or handover, or may be inter-frequency cell reselection, sell selection or handover. For example, the present invention is also applicable to the case where a CSG cell is operated on a dedicated frequency carrier different from that of a non-CSG cell.

The present invention has individually described the first embodiment to the eleventh embodiment, which may be used in combination.

It is possible to flexibly deploy a hybrid cell in a system or provide various services, as well as to favor, at a hybrid cell, the access of CSG members belonging to the same CSG as the hybrid cell belongs to that make access in a closed access mode over the access of non-CSG members that make access in an open access mode for providing benefits in service and account setting.

While the LTE system (E-UTRAN) is mainly described in the present invention, the present invention is applicable to the W-CDMA system (UTRAN, UMTS) and LTE-Advanced. Further, the present invention is applicable to a mobile communication system in which a closed subscriber group (CSG) is introduced, a communication system in which an operator identifies subscribers and the identified subscribers are allowed access as in the CSG, and a communication system in which a cell having a smaller cell radius compared with a normal cell is introduced as in the case of HeNB.

The invention claimed is:

1. A method of operating a mobile communication system including an access group consisting of one or more registered user equipments and one or more base stations, comprising:
allowing the one or more base stations included in said access group to have access in a closed mode from the one or more registered user equipments included in the same access group and access in an open mode from a user equipment that is not included in the same access group; and
making a communication area of the one or more base stations in said allowed open mode identical to a communication area of the one or more base stations in said allowed closed mode by making parameter values of at least one of the parameters of maximum transmission power, a tilt angle of an antenna, and the maximum allowed transmission power of each of the user equipments being served have a same parameter value relative to the one or more base stations in said allowed open mode and relative to the one or more base stations in said allowed closed mode.

2. A method of operating a mobile communication system including an access group consisting of one or more registered user equipments and one or more base stations, comprising:
allowing the one or more base stations included in said access group to have access in a closed mode from the one or more registered user equipments included in the same access group and access in an open mode from a user equipment that is not included in the same access group; and
making a communication area of the one or more base stations in said allowed open mode identical to a communication area of the one or more base stations in said allowed closed mode,
wherein the step of making a communication area of the one or more base stations in said allowed open mode identical to a communication area of the one or more base stations in said allowed closed mode includes making parameters defining said communication area identical to each other between said one or more base stations in said allowed open mode and said one or more base stations in said allowed closed mode.

3. The method according to claim 1, further comprising:
executing reselection from a hybrid base station to another base station or reselection from said another base station to said hybrid base station based on identical reselection criteria in said closed mode and in said open mode.

4. The method according to claim 3, further comprising:
insuring that parameters that define the criteria for executing reselection in said closed mode are identical to parameters that define the criteria for executing reselection in said open mode.

5. The method according to claim 1, further comprising:
executing a handover from a hybrid base station that is allowed the access in said closed mode and the access in said open mode to another base station or handover from said another base station to said hybrid base station based on identical handover criteria in said closed mode and in said open mode.

6. The method according to claim 5, wherein parameters that define the handover criteria for executing handover in said closed mode are identical to parameters that define the handover criteria for executing handover in said open mode.

7. The method according to claim 1, further comprising:
redirecting the user equipment in the open mode from a hybrid base station that is hybridly allowed the access in said closed mode and the access in said open mode to another base station in a congested communication state of the hybrid base station.

8. The method according to claim 7, further comprising:
completing a requested connection between the user equipment in said closed mode and said hybrid base station after performing the redirecting step.

9. The according to claim 7, further comprising:
completing a requested connection between the user equipment in said closed mode and said hybrid base station prior to performing the redirecting step.

10. The method according to claim 7, wherein said redirecting step is performed as a handover of the user equipment from said hybrid base station to said another base station, and the method further comprises executing a step of providing a setting change to prohibit the user equipment from reverting back to said hybrid base station after the handover to said another base station succeeds.

11. The-method according to claim 7, further comprising:
releasing a handover connection made when the user equipment in the open mode is redirected from communicating with said hybrid base station to communicating with said another base station through a handover after a lapse of a predetermined time period.

12. The method according to claim 7, further comprising:
prohibiting a reversion back to said hybrid base station when the redirecting step fails.

13. The method according to claim 7, wherein a plurality of target base stations for redirection from said hybrid base station are set as said another base station.

14. The method according to claim 13, wherein when the user equipment in the open mode is redirected from said hybrid base station to said another base station through a handover including a handover preparation step, a handover execution step and a handover completion step, said handover preparation step is non-serially performed on a plurality of base stations and said handover execution step and said handover completion step are sequentially performed on the plurality of base stations until the handover succeeds.

15. The method according to claim 13, wherein when said hybrid base station hands over the user equipment in the open mode to said another base station using handover steps including a handover preparation step, a handover execution step and a handover completion step that are sequentially performed on a plurality of base stations until the handover succeeds.

16. The method according to claim 7, wherein said hybrid base station notifies the user equipment in the open mode of redirection to said another base station.

17. The method according to claim 13, wherein when the user equipment in the open mode is redirected from said hybrid base station to said another base station through a handover, a time period for defining a failure of a series of handover to a plurality of target base stations is set, and a handover failure is established after a lapse of the time period.

* * * * *